(12) United States Patent
Mayerle

(10) Patent No.: US 12,740,513 B2
(45) Date of Patent: Sep. 22, 2026

(54) WEED SEED DESTRUCTION

(71) Applicant: Dean Mayerle, Saskatoon (CA)

(72) Inventor: Dean Mayerle, Saskatoon (CA)

(73) Assignee: Tritana Intellectual Property Ltd., Saskatoon (CA)

( * ) Notice: Subject to any disclaimer, the term of this patent is extended or adjusted under 35 U.S.C. 154(b) by 721 days.

(21) Appl. No.: 18/083,628

(22) Filed: Dec. 19, 2022

(65) Prior Publication Data

US 2023/0141301 A1 May 11, 2023

Related U.S. Application Data

(63) Continuation of application No. 16/639,198, filed as application No. PCT/CA2018/051120 on Sep. 11, (Continued)

(51) Int. Cl.
*A01F 12/40* (2006.01)
*A01D 41/12* (2006.01)
(Continued)

(52) U.S. Cl.
CPC .......... *A01F 12/40* (2013.01); *A01D 41/1243* (2013.01); *A01D 41/127* (2013.01); *A01D 41/14* (2013.01)

(58) Field of Classification Search
CPC .............. A01D 29/01; A01D 29/00–22; A01D 14/1243; A01D 14/127; A01F 12/40
See application file for complete search history.

(56) References Cited

U.S. PATENT DOCUMENTS 2,064,689 A 12/1936 Russwurm
2,557,865 A 6/1951 Emmanouilidis
(Continued)

FOREIGN PATENT DOCUMENTS

AU A-37966/95 5/1996
AU 200138781 10/2001
(Continued)

OTHER PUBLICATIONS

GRDC Grownotes, Durum, Weed Control, published Aug. 15, 2017 on Google <URL:https://grdc.com.au/_data/assets/pdf_file/0036/369477/GrowNote-Durum-South-6-Weed-control.pdf>.

*Primary Examiner* — Adam J Behrens
(74) *Attorney, Agent, or Firm* — Adrian D. Battison; Ryan W. Dupuis; Ade & Company Inc.

(57) ABSTRACT

Weed seeds are destroyed in the chaff from a combine harvester by repeated high speed impacts caused by a rotor mounted in one of a pair of side by side housings which accelerate the discarded seeds in a direction centrifugally away from the rotor onto a stator including angularly adjustable stator surfaces around the axis. Thus the discarded seeds rebound back and forth between the rotor and the stator to provide a plurality of impacts. The seeds are carried axially of the rotor by a controlled airstream so that they move to an axial discharge location where a discharge fan is mounted. The angle of the discharge around the rotor axis can be changed to direct the seeds to the side of the combine away from a straw chopper, towards the guide fins of the tailboard of the chopper, or into the housing of the straw chopper.

22 Claims, 22 Drawing Sheets

Related U.S. Application Data

2018, now abandoned, which is a continuation-in-part of application No. 15/701,096, filed on Sep. 11, 2017, now Pat. No. 10,492,369.

(60) Provisional application No. 62/763,112, filed on Feb. 1, 2018.

(51) Int. Cl.
*A01D 41/127* (2006.01)
*A01D 41/14* (2006.01)

(56) References Cited

U.S. PATENT DOCUMENTS

| | | | | |
|---|---|---|---|---|
| 2,775,174 | A | 12/1956 | Petrick | |
| 3,071,246 | A | 1/1963 | Schimke | |
| 3,448,933 | A | 6/1969 | Roy | |
| 3,894,695 | A | 7/1975 | Benedikter | |
| 4,591,102 | A | 5/1986 | Clarke | |
| 4,630,773 | A * | 12/1986 | Ortlip | A01C 17/006 239/11 |
| 4,637,406 | A | 1/1987 | Guinn | |
| 4,711,253 | A | 12/1987 | Anderson | |
| 4,917,652 | A | 4/1990 | Glaubitz | |
| 4,923,431 | A | 5/1990 | Miller | |
| 5,425,507 | A | 6/1995 | Stumpff | |
| 5,556,042 | A | 9/1996 | Roberg | |
| 5,944,604 | A | 8/1999 | Niermann | |
| 5,995,895 | A * | 11/1999 | Watt | G05D 1/0274 56/10.2 G |
| 6,185,990 | B1 * | 2/2001 | Missotten | A01B 79/005 56/10.2 A |
| 6,500,064 | B1 | 12/2002 | Schrattenecker | |
| 6,547,169 | B1 | 4/2003 | Matousek | |
| 6,656,038 | B1 | 12/2003 | Persson | |
| 6,685,558 | B2 | 2/2004 | Niermann | |
| 6,840,854 | B2 | 1/2005 | Fedekop | |
| 6,908,379 | B2 | 6/2005 | Gryspeerdt | |
| 8,152,610 | B2 | 4/2012 | Harrington | |
| 8,167,691 | B2 | 5/2012 | Pohlmann | |
| 8,210,915 | B2 | 7/2012 | Holmen | |
| 8,789,785 | B2 | 7/2014 | Lelas | |
| 9,497,903 | B2 | 11/2016 | Biggerstaff | |
| 9,635,813 | B2 | 5/2017 | Dilts | |
| 9,686,916 | B2 | 6/2017 | Biggerstaff | |
| 9,723,790 | B2 | 8/2017 | Berry | |
| 9,730,390 | B2 | 8/2017 | Maes | |
| 9,949,434 | B2 | 4/2018 | Baes | |
| 10,004,176 | B2 | 6/2018 | Mayerle | |
| 10,653,069 | B2 | 5/2020 | Farley | |
| 2003/0003974 | A1 | 1/2003 | Niermann | |
| 2003/0114207 | A1 | 6/2003 | Wolters | |
| 2004/0132517 | A1 | 7/2004 | Weichholdt et al. | |
| 2005/0277454 | A1 | 12/2005 | Couture | |
| 2010/0291985 | A1 | 11/2010 | Pohimann | |
| 2011/0059782 | A1 * | 3/2011 | Harrington | B02C 13/288 241/278.1 |
| 2014/0364179 | A1 | 12/2014 | Brinkmann | |
| 2015/0373913 | A1 * | 12/2015 | Berry | A01F 12/00 460/149 |
| 2016/0044869 | A1 | 2/2016 | Mayerle | |
| 2016/0044870 | A1 | 2/2016 | Mayerle | |
| 2016/0113202 | A1 | 4/2016 | Mayerle | |
| 2016/0150727 | A1 | 6/2016 | Mayerle | |
| 2016/0150728 | A1 | 6/2016 | Duquesne | |
| 2017/0079207 | A1 | 3/2017 | Puryk | |
| 2017/0238463 | A1 * | 8/2017 | Van de Wege | A01F 12/40 |
| 2018/0070534 | A1 | 3/2018 | Mayerle | |
| 2018/0249641 | A1 | 9/2018 | Lewis | |
| 2018/0317392 | A1 | 11/2018 | Mayerle | |
| 2018/0368319 | A1 | 12/2018 | Desmet | |
| 2019/0008091 | A1 * | 1/2019 | Isaac | A01D 41/127 |
| 2019/0069470 | A1 * | 3/2019 | Pfeiffer | A01B 79/005 |
| 2020/0296896 | A1 | 9/2020 | Mayerle | |
| 2021/0022289 | A1 | 1/2021 | Berry | |
| 2021/0282329 | A1 | 9/2021 | Hall | |

FOREIGN PATENT DOCUMENTS

| | | | | |
|---|---|---|---|---|
| AU | 2014218502 | | 8/2014 | |
| AU | 2017228663 | | 10/2017 | |
| AU | 2017228663 | A1 * | 10/2017 | A01D 41/1243 |
| AU | 2018100350 | | 5/2018 | |
| AU | 2019202177 | | 10/2019 | |
| CN | 20244482 | | 9/2012 | |
| DE | 382632 | | 2/1990 | |
| DE | 102006040255 | | 4/2007 | |
| DE | 102006002437 | A1 * | 7/2007 | A01B 79/005 |
| DE | 102009042002 | | 3/2011 | |
| DE | 102011088512 | | 1/2017 | |
| DE | 102018131432 | | 6/2020 | |
| EP | 1027820 | | 2/2000 | |
| EP | 1191835 | | 4/2002 | |
| EP | 1442649 | | 1/2003 | |
| EP | 1905291 | | 4/2008 | |
| EP | 2976937 | | 1/2016 | |
| EP | 3520596 | | 11/2018 | |
| GB | 1062209 | | 3/1967 | |
| GB | 2297468 | A * | 8/1996 | A01B 79/005 |
| WO | WO 01/01754 | | 1/2001 | |
| WO | WO-2008156419 | | 12/2008 | |
| WO | WO-2009100500 | | 8/2009 | |
| WO | WO-2009100500 | A1 * | 8/2009 | A01F 12/40 |
| WO | WO-2014127408 | | 8/2014 | |
| WO | WO-2014127408 | A1 * | 8/2014 | A01D 41/12 |
| WO | WO2017/008161 | | 1/2017 | |
| WO | WO-2017008161 | A1 * | 1/2017 | A01D 41/1243 |
| WO | WO2018053600 | | 3/2018 | |
| WO | WO-2018053600 | A1 * | 3/2018 | A01D 41/12 |
| WO | WO2019178651 | | 9/2019 | |
| WO | WO-2020160622 | | 8/2020 | |

* cited by examiner 1
16A
16B
101
10
16
9
36
39
9A
37
38
4
41C
3
2
35

WEED SEED DESTRUCTION

This application continuation application of application Ser. No. 16/639,198 filed Feb. 14, 2020 which is a National Phase application under 35 USC 371 of PCT Application PCT/CA2018/051120 filed Sep. 11, 2018 which is a continuation in part of application Ser. No. 15/701,096 filed Sep. 11, 2017. This application claims the benefit under 35 USC 119 (e) of Provisional application 62/763,112 filed Feb. 1, 2018.

This invention relates to a weed seed destructor which can be attached to a combine harvester so that weed seeds in the discharged chaff can be devitalized before being spread onto the ground.

BACKGROUND OF THE INVENTION

Combine harvesters harvest cereal grain crops, such as wheat, oats, rye, barley, corn, soybeans and flax. Grain and straw are separated in a combine harvester. Following the separation process, waste straw and chaff is supplied to a chopper for shredding and distributing back over the field in an even spread pattern.

During the harvesting process weed seeds and grain seed are discharged with the residue into the chopper and spread back onto the field. The combine is then effectively acting as a seeder to evenly spread the seed back onto the field. In a number of areas of the world herbicides are used heavily to control the weed seeds however this has led to weed seed that has become resistant to the herbicide. Grain seed has been developed to be resistant to specific herbicides, which depending on crop rotations can be a problem for subsequent crop.

It is known that if the seed can be removed or destroyed before the combine spreads it back onto the field the cycle can be stopped. Research has shown that, with three consecutive cycles of weed and grain removal, significant reductions in herbicide can be obtained providing huge saving for farmers.

One recent approach is shown in WO 2014/127408 published Aug. 28, 2014 and assigned to Grains Research Development Corporation Australia which shows that a plurality of impacts at relatively high speed of the seeds with a stationary object causes breakdown of the seed sufficient to prevent germination. Thus they have developed a cage mill which is integrally mounted inside the combine harvester so as to receive waste material (discarded seeds and chaff) from the sieve. The cage mill assembly includes at least one rotating ring carrying a plurality of blades and a series of outer stationary rings or fixed blades. Thus the seeds are accelerated outwardly by escaping centrifugally from the rotating blades into the surrounding stationary blades of the outer rings where a series of impacts occur as the seeds move outwardly into and through the fixed blades. The seeds are released outwardly under the centrifugal force from the stationary blades and escape outwardly into a peripheral channel for discharge.

The document shows evidence that four impacts at relatively high speed are sufficient to cause the required breakdown of the seeds, for example to obtain a 95% kill rate.

However the cage mill shown is large and complex with numerous rings running in opposite directions. Should a rock, or other hard material enter the mill, the entire cage mill would need to be replaced. Thus the system may function to destroy the seeds but has practical difficulties as it is without consideration of other obstacles passing through the assembly. The assembly runs at a very high rotational speed, so the precision in manufacturing is critical. Although this is believed that this arrangement is closer to commercialization a number of problems remain with the design.

U.S. Pat. No. 3,448,933 (Roy) issued Jun. 10, 1969 describes a cone style grinding shear mill used to process weed seed. All excess chaff and weed seed is processed by the unit. However it is a permanently fixed grinder without a means to bypass material other than residue. It would also allow passage of small fine seeds as it would need to be set to the average seed size to allow adequate throughput.

U.S. Pat. No. 5,059,154 (Reyenga) issued Oct. 22, 1991 discloses a pair of rollers to mill seeds smaller than grain that are in the clean grain auger. This does not address seeds thrown over the back of the sieve and would not work if placed behind the sieve as today's combines the chaff stream is often 6 inches thick which would cushion the seeds and allow the spread of live seed back onto the field.

In AU Published Application 2001/038781 an additional sieve is added to remove more of the chaff before milling, and separate the weed seed from the grain. However this is not practical with today's combines. All combines throw out some grain and farmers want the herbicide tolerant grain removed as well.

U.S. Pat. No. 8,152,610 (Harrington) issued Apr. 10, 2012 discloses an arrangement which processes all the chaff coming off of the sieves and blows it to a trailing cart to pulverize all of the residue. The cart requires a second engine running in the dust of the combine and the mill requires a significant amount of power to pulverize and discharge the residue back onto the field. The cage mill disclosed is large and complex with numerous rings running in opposite directions. Again, the rings have not removable parts so should a rock, or other hard material enter it the entire cage mill would need to be replaced. The cost of this system will limit its commercial viability.

The term weed seed destruction used herein is used somewhat colloquially in that the seeds are not annihilated but are devitalized or rendered so that they cannot germinate. It will of course also be appreciated that not necessarily each and every seed is destroyed but that the intention is that a significant number will be incapable of germination so as to reduce the number of emerging seeds in the growing season.

SUMMARY OF THE INVENTION

According to the invention there is provided a combine harvester comprising:

- a separation system for separating from harvested crop a first material comprising straw and a second material comprising chaff and weed seeds;
- a weed seed devitalizer;
- and a controller configured to:
- receive data indicating forthcoming weed seeds; and
- output control signals controlling operation of the weed seed devitalizer based on the data.

According to the invention there is provided a combine harvester comprising:

- a separation system for separating from harvested crop a first material comprising straw and a second material comprising chaff and weed seeds;
- a weed seed devitalizer;
- and a controller configured to:
- receive data relating to a GPS map of a weed problem in an area to be harvested; and
- output control signals controlling operation of the weed seed devitalizer based on the data.

Also disclosed herein there is provide an apparatus for destroying weed seeds comprising:

- a housing arranged to be mounted at a location on a combine harvester for receiving a feed material containing separated chaff and weed seeds separated by the combine harvester from harvested crop;
- a rotor mounted in the housing for rotation about an axis and including rotor surfaces thereon for engaging the feed material and for accelerating the feed material in a direction outwardly from the axis of the rotor;
- at least one stator arranged at a location along the direction and comprising a stator support member and a plurality of stator portions mounted on the support member for engaging the weed seeds in the accelerated feed material;
- wherein there is provided a generally horizontal shaft mounted on the housing and including a gear box for driving a generally upstanding drive shaft and wherein the rotor is mounted on the drive shaft on top of the horizontal shaft.

Also disclosed herein there is provided an apparatus for destroying weed seeds comprising:

- a housing arranged to be mounted at a location on a combine harvester for receiving a feed material containing separated chaff and weed seeds separated by the combine harvester from harvested crop;
- a rotor mounted in the housing for rotation about an axis and including rotor surfaces thereon for engaging the feed material and for accelerating the feed material in a direction outwardly from the axis of the rotor;
- at least one stator arranged at a location along the direction and comprising a stator support member and a plurality of stator portions mounted on the support member for engaging the weed seeds in the accelerated feed material;
- wherein there is provided an inner stator and an outer stator coaxial therewith and at least one of inner and outer stators is adjustable to change the angular relationship therebetween;
- and wherein the angular position of at least one of the stators is adjustable by a control linkage from a cab of the combine harvester.

Also disclosed herein there is provide an apparatus for destroying weed seeds comprising:

- a housing arranged to be mounted at a location on a combine harvester for receiving a feed material containing separated chaff and weed seeds separated by the combine harvester from harvested crop;
- a rotor mounted in the housing for rotation about an axis and including rotor surfaces thereon for engaging the feed material and for accelerating the feed material in a direction outwardly from the axis of the rotor;
- at least one stator arranged at a location along the direction and comprising a stator support member and a plurality of stator portions mounted on the support member for engaging the weed seeds in the accelerated feed material;
- wherein each of the rotor blades includes a sharpened cutting edge radial to the axis.

Also disclosed herein there is provide an apparatus for destroying weed seeds comprising:

- a housing arranged to be mounted at a location on a combine harvester for receiving a feed material containing separated chaff and weed seeds separated by the combine harvester from harvested crop;
- a rotor mounted in the housing for rotation about an axis and including rotor surfaces thereon for engaging the feed material and for accelerating the feed material in a direction outwardly from the axis of the rotor;
- at least one stator arranged at a location along the direction and comprising a stator support member and a plurality of stator portions mounted on the support member for engaging the weed seeds in the accelerated feed material;
- wherein the rotor also includes an additional blade element outside of the outer stator element.

Preferably in any of the above aspects the stator support member is cylindrical so as to surround the axis of the rotor and the stator portions are part cylindrical with each of the plurality of stator portions extending around a part only of the periphery of the support member.

Preferably in any of the above aspects there is provided a discharge opening between each stator portion and the next.

Preferably in any of the above aspects there are provided inner and outer coaxial cylindrical stators.

Preferably in any of the above aspects there are provided rotor components between the inner and outer stators.

Preferably in any of the above aspects each stator portion comprises a plurality of upstanding impact posts at spaced positions around the axis.

Preferably in any of the above aspects there is provided a plurality of the stator portions having different characteristics which can be selected for different weed seed sizes.

Preferably in any of the above aspects the stator portions are hard surface coated as a separate component from the support member.

Preferably in any of the above aspects each of the stator portions comprises mounting edges at angularly spaced ends of the portion for attachment to a rail of the support member.

Preferably in any of the above aspects the support member comprises a top and bottom ring around the axis of the rotor with a plurality of rails parallel to the rotor axis.

Preferably in any of the above aspects each of the stator portions comprises an angularly spaced row of deflector surfaces parallel to the rotor axis.

Preferably in any of the above aspects the stator includes a plurality of discharge openings at angularly spaced positions around the stator with the support member being angularly adjustable around the rotor axis to move the openings.

Preferably in any of the above aspects there is provided an inner stator and an outer stator coaxial therewith and at least one of inner and outer stators is adjustable to change the angular relationship therebetween.

Preferably in any of the above aspects the angular position of at least one of the stators is adjustable by a control linkage from a cab of the combine harvester.

Preferably in any of the above aspects the rotor comprises a hub carrying rotor blades defining said rotor surfaces where the blades are pivotally mounted about an axis parallel to the rotor axis so as to act as blades.

Preferably in any of the above aspects each of the rotor blades includes a sharpened cutting edge radial to the axis and a fan blade portion generally axial of the axis.

Preferably in any of the above aspects the rotor also includes an additional blade element outside of the outer stator element.

Preferably in any of the above aspects each of the additional blade elements includes a sharpened cutting edge radial to the axis and a fan blade portion generally axial of the axis.

Preferably in any of the above aspects each of the additional blade elements is located underneath the stator.

Preferably in any of the above aspects there are two rotors each mounted on a respective gear box at spaced positions along the horizontal shaft.

The invention herein can be used with many different types of stator in a multi-stage impact mill including round or flat surfaces and other obstacles which engage the material as it is carried by the rotor. Examples are shown in the above cited patent documents. In one example the stator includes perforated stator plates with an opening between each plate and the next. However the same constructions defined herein can be used with stator elements where the material passes between one obstacle or blade and the next in an array around the axis.

Preferably the support member is cylindrical so as to surround the axis of the rotor and the stator surface portions are part cylindrical.

Preferably the stator surface portions have a common axial dimension.

Preferably each of the plurality of stator surface portions extends around a part only of the periphery of the support member.

In one example there is provided a discharge opening between each stator surface portion and the next so that some of the material escapes through perforations in the stator surfaces and some escapes through a discharge opening. However many other styles and arrangement of the stator can be used.

Preferably there are provided at least two stators arranged as inner and outer coaxial cylindrical stators but there may be more stators.

Preferably there are provided rotor components between the inner and outer stators to assist in movement of the material between the stators and to carry the material around the inside surface of the outer stator to process the material.

In one embodiment, each stator surface portion comprises a plate which is perforated with an array of holes so that the material slides over the inner surface of the part cylindrical plate to interact with the holes.

Preferably a plurality of the stator surface portions having different characteristics which can be selected for different weed seed sizes.

Preferably the stator surface portions are hard surface coated as a separate component from the support member. In this arrangement, each of the stator surface portions comprises a frame and bars which can be hardened as a separate relatively small component using known processes.

For example each of the stator surface portions comprises mounting edges at angularly spaced ends of the portion for attachment to a rail of the support member. That is a simple construction of the stator surface portions is a r pair of sheet metal plates curved to provide the required part cylindrical shape with turned down end portions to act as mounting flanges with bars welded between to provide the impact surfaces.

Preferably the support member comprises a top and bottom ring around the axis of the rotor with a plurality of rails parallel to the rotor axis to allow each of the portions to be attached at angular spaced positions around the axis.

Preferably there is a seal created between the rotor and at least one stator ring to eliminate a pathway through the mill in which weed seeds can escape without contacting a stator surface In another embodiment each of the stator surface portions comprises an angularly spaced row of deflector surfaces parallel to the rotor axis.

Preferably there is provided an inner stator and an outer stator coaxial therewith and at least one of inner and outer stators is adjustable to change the angular relationship therebetween.

Preferably the angular position of at least one of the stators is adjustable from the cab.

Preferably the rotor comprises a hub carrying rotor blades defining rotor surfaces where the blades are pivotally mounted about an axis parallel to the rotor axis so as to act as blades.

Preferably said stator and said one or more stator surfaces of the stator are arranged such that the weed seeds impact on said one or more stator surfaces and do not pass through the stator along said direction but instead are rebounded therefrom back toward the rotor and such that the weed seeds rebound back and forth between the rotor and the stator to provide a plurality of impacts on the accelerated feed material to destroy at least some of the weed seeds.

Preferably at least one of the rotor surfaces and/or at least one of the stator surfaces is arranged to pivot to a position to increase a spacing between the stator and rotor surfaces to allow the passage of foreign objects between the rotor and stator surfaces.

Preferably the rotational speed of the rotor is adjustable to change the number of impacts a seed encounters during its passage.

Also disclosed herein there is provided an apparatus for destroying weed seeds comprising:

- a housing arranged to be mounted at a location on a combine harvester for receiving from the location a feed material containing separated chaff and weed seeds separated by the combine harvester from harvested crop;
- a rotor mounted in the housing for rotation about an axis and including rotor surfaces thereon for engaging the feed material and for accelerating the feed material in a direction outwardly from the axis of the rotor;
- a stator arranged at a location along the direction and including one or more stator surfaces for engaging the weed seeds in the accelerated feed material;
- wherein the stator surfaces are movable in an adjustment movement so as to change the number of impacts caused to each weed seed.

Preferably the stator surfaces are movable in the adjustment movement about an axis parallel to the rotor axis.

Also disclosed herein there is provided an apparatus for destroying weed seeds comprising:

- a housing arranged to be mounted at a location on a combine harvester for receiving from the location a feed material containing separated chaff and weed seeds separated by the combine harvester from harvested crop;
- a rotor mounted in the housing for rotation about an axis and including rotor surfaces thereon for engaging the feed material and for accelerating the feed material in a direction outwardly from the axis of the rotor;
- a stator arranged at a location along the direction and including one or more stator surfaces for engaging the weed seeds in the accelerated feed material;
- wherein the stator surfaces are replaceable.

Also disclosed herein there is provided an apparatus for destroying weed seeds comprising:

- a housing arranged to be mounted at a location on a combine harvester for receiving from the location a feed material containing separated chaff and weed seeds separated by the combine harvester from harvested crop;

a rotor mounted in the housing for rotation about an axis and including rotor surfaces thereon for engaging the feed material and for accelerating the feed material in a direction outwardly from the axis of the rotor;

a stator arranged at a location along the direction and including one or more stator surfaces for engaging the weed seeds in the accelerated feed material;

said stator and said one or more stator surfaces of the stator being arranged such that the weed seeds impact on said one or more stator surfaces;

wherein the rotor comprises a hub carrying rotor blades defining said rotor surfaces where the blades are pivotally mounted about an axis parallel to the rotor axis so as to act as blades.

Also disclosed herein there is provided an apparatus for destroying weed seeds for use in a combine harvester where the combine harvester comprises a separation system for separating from harvested crop at a first discharge location a first material comprising straw and at a second discharge location a second material comprising chaff and said weed seeds, the apparatus comprising:

a straw chopper section comprising:

a chopper housing arranged to receive from the first discharge location the first material containing straw;

a chopper rotor mounted in the chopper housing having a plurality of chopping blades for chopping the straw for discharge from the first housing component;

and a spreading device for receiving the straw discharged from the chopper housing and spreading the discharged straw to rear and sides of the combine harvester;

a weed seed destructor section comprising:

a destructor housing arranged to receive from the second discharge location the second material;

a rotor arrangement mounted in the destructor housing for rotation about an axis and including rotor surfaces thereon for engaging the second material and for accelerating the feed material in a direction outwardly from the axis of the rotor;

a stator arrangement mounted at a location along the direction and including a plurality of stator surfaces for engaging the weed seeds in the accelerated second material to cause a plurality of impacts with the weed seeds;

and at least one a discharge mouth for discharge of the second material after the plurality of impacts;

said at least one discharge mouth being located so as to direct the second material underneath the bottom wall onto the spreading device.

Preferably said rotor arrangement comprises two rotors each having an upstanding axis of rotation with the two rotors arranged side by side across the combine harvester and wherein said at least one discharge mouth comprises two discharge mouths at spaced positions across combine harvester and each arranged to direct the second material underneath the chopper housing onto the spreading device.

Preferably the spreading device comprises a tailboard with a plurality of fins and the discharge mouth is oriented to direct the second material onto the fins.

Preferably the weed seed destructor section is mounted with an intake in front of the chopper housing and with the rotor and stator underneath the chopper housing.

Also disclosed herein there is provided an apparatus for destroying weed seeds for use in a combine harvester where the combine harvester comprises a separation system for separating from harvested crop at a first discharge location a first material comprising straw and at a second discharge location a second material comprising chaff and said weed seeds, the apparatus comprising:

a straw chopper section comprising:

a chopper housing arranged to receive from the first discharge location the first material containing straw;

a chopper rotor mounted in the chopper housing having a plurality of chopping blades for chopping the straw for discharge from the first housing component;

and a spreading device for receiving the straw discharged from the chopper housing and spreading the discharged straw to rear and sides of the combine harvester;

a weed seed destructor section comprising:

a destructor housing arranged to receive from the second discharge location the second material;

a rotor arrangement mounted in the destructor housing for rotation about an axis and including rotor surfaces thereon for engaging the second material and for accelerating the feed material in a direction outwardly from the axis of the rotor;

a stator arrangement mounted at a location along the direction and including a plurality of stator surfaces for engaging the weed seeds in the accelerated second material to cause a plurality of impacts with the weed seeds;

and at least one a discharge mouth for discharge of the second material after the plurality of impacts;

and a guide wall component movable between a first position and a second position where:

in the first position the chaff and said weed seeds from the second discharge location are directed into the weed seed destructor, while the straw from the first discharge location enters the chopper housing; and in the second position the chaff and said weed seeds from the second discharge location are directed into the chopper housing with the straw.

Also disclosed herein there is provided an apparatus for destroying weed seeds for use in a combine harvester where the combine harvester comprises a separation system for separating from harvested crop at a first discharge location a first material comprising straw and at a second discharge location a second material comprising chaff and said weed seeds, the apparatus comprising:

a straw chopper section comprising:

a chopper housing arranged to receive from the first discharge location the first material containing straw;

a chopper rotor mounted in the chopper housing having a plurality of chopping blades for chopping the straw for discharge from the first housing component;

and a spreading device for receiving the straw discharged from the chopper housing and spreading the discharged straw to rear and sides of the combine harvester;

a weed seed destructor section comprising:

a destructor housing arranged to receive from the second discharge location the second material;

a rotor arrangement mounted in the destructor housing for rotation about an axis and including rotor surfaces thereon for engaging the second material and for accelerating the feed material in a direction outwardly from the axis of the rotor;

a stator arrangement mounted at a location along the direction and including a plurality of stator surfaces for engaging the weed seeds in the accelerated second material to cause a plurality of impacts with the weed seeds;

and a guide wall component movable between a first position and a second position where:

in the first position the chaff and said weed seeds from the second discharge location are directed into the weed seed destructor, while the straw enters the spreading device; and in the second position the chaff and said weed seeds from the second discharge location are directed into the straw spreading device.

This arrangement can be used in conjunction with a conventional arrangement in which the chopper section is mounted internally within the combine housing instead of at the rear. Therefore at the rear is provided a rotary type spreader including typically two horizontal disks similar to the conventional chaff spreading system. Thus in this arrangement the chaff and weed seeds form the weed seed destruction section are directed by a guide onto the rotary straw spreader system for common spreading of all material. Again the combined spreading action and the additional air flow can enhance the spreading action to meet the objective of spreading at header width.

Preferably the weed seed destructor section is mounted with an intake in front of the chopper housing and with the rotor and stator underneath the chopper housing.

Preferably the guide wall component comprises a front wall portion of the chopper housing which is pivotal about an axis across a front of the chopper housing and parallel to the axis of the chopper rotor.

Preferably the guide wall component includes a front position which extends from the chopper housing upward and forwardly so as to butt against or adjacent guide wall surfaces for the chaff and for the straw respectively.

Preferably there is provided a quick disconnection for halting drive to the rotor of the weed seed destructor when the wall portion is in in the second position.

Also disclosed herein there is provided an apparatus for destroying weed seeds for use in a combine harvester where the combine harvester comprises a separation system for separating from harvested crop at a first discharge location a first material comprising straw and at a second discharge location a second material comprising chaff and said weed seeds, the apparatus comprising:

a straw chopper section comprising:

a chopper housing arranged to receive from the first discharge location the first material containing straw;

a chopper rotor mounted in the chopper housing having a plurality of chopping blades for chopping the straw for discharge from the first housing component;

and a spreading device for receiving the straw discharged from the chopper housing and spreading the discharged straw to rear and sides of the combine harvester;

a weed seed destructor section comprising:

a destructor housing arranged to receive from the second discharge location the second material;

a rotor arrangement mounted in the destructor housing for rotation about an axis and including rotor surfaces thereon for engaging the second material and for accelerating the feed material in a direction outwardly from the axis of the rotor;

a stator arrangement mounted at a location along the direction and including a plurality of stator surfaces for engaging the weed seeds in the accelerated second material to cause a plurality of impacts with the weed seeds;

and at least one a discharge mouth for discharge of the second material after the plurality of impacts;

at least the weed seed destructor being movable rearwardly of the combine harvester to allow access to a position between the weed seed destructor and the components of the combine harvester at the second discharge location.

Preferably the weed seed destructor section is slidable on a guide in a rearward direction.

Preferably both the straw chopper section and the weed seed destructor section are movable rearwardly of the combine harvester.

Preferably the weed seed destructor section is mounted with an intake in front of the chopper housing and with the rotor and stator underneath the chopper housing.

Also disclosed herein there is provided an apparatus for destroying weed seeds comprising:

a housing arranged to be mounted at a location on a combine harvester for receiving from the location a feed material containing separated chaff and weed seeds separated by the combine harvester from harvested crop;

a rotor mounted in the housing for rotation about an axis and including rotor surfaces thereon for engaging the feed material and for accelerating the feed material in a direction outwardly from the axis of the rotor;

a stator arranged at a location along the direction and including one or more stator surfaces for engaging the weed seeds in the accelerated feed material;

said stator and said one or more stator surfaces of the stator being arranged such that the weed seeds impact on said one or more stator surfaces and do not pass through the stator along said direction but instead are rebounded therefrom back toward the rotor;

the rotor and stator being arranged such that the weed seeds rebound back and forth between the rotor and the stator to provide a plurality of impacts on the accelerated feed material to destroy at least some of the weed seeds;

wherein the housing includes a discharge opening for discharge of the feed material after the plurality of impacts, where the discharge opening is at a location different from the stator so that said weed seeds discharged from the rotor through said discharge opening do not pass through the stator.

Also disclosed herein there is provided an apparatus for destroying weed seeds comprising:

a housing arranged to be mounted at a location on a combine harvester for receiving a feed material containing separated chaff and weed seeds separated by the combine harvester from harvested crop;

a rotor mounted in the housing for rotation about an axis and including rotor surfaces thereon for engaging the feed material and for accelerating the feed material in a direction outwardly from the axis of the rotor;

at least one stator arranged at a location along the direction and comprising a stator support member and a plurality of stator portions mounted on the support member for engaging the weed seeds in the accelerated feed material;

wherein at least one stator includes a frame with replaceable inserts.

Preferably inserts of different geometry can be utilized in the assembly

Preferably the inserts are a different hardness as compared with the frame

Preferably the inserts contain a different material than the stator frame.

Preferably therefore the discharge opening for discharge of the feed material after the plurality of impacts the discarded seeds discharge from the rotor and do not pass through the stator but instead are rebounded away from the stator to discharge at a different location. In this way, any foreign bodies are not trapped in the stator to cause damage but instead can escape to the discharge.

In the preferred arrangement described in detail hereinafter, the rotor rotates around an axis so as to direct the discarded seeds centrifugally outwardly, and the stator surrounds the axis so as to rebound the discarded seeds back toward the axis and the discharge opening is arranged such that the discarded seeds discharge axially from within the stator.

In one arrangement the rotor is mounted directly under the first discharge location of the combine harvester with the rotor axis generally upright so that the feed material fold directly into the top of the housing on to the rotor along the axial direction of the rotor.

As an alternate embodiment the apparatus comprises a horizontally rotating tube, with auger fighting in the middle, moving the feed material or chaff to an impact zone at each end of the horizontal rotor. The discharge zone is then at the end and is arranged to expel into the straw chopper of the combine harvester.

Preferably as a feature of independent importance the feed material enters the housing axially of the rotor at one end and discharges axially from the opposite end of the rotor.

Preferably as a feature of independent importance there is provided a fan component for driving the discarded seeds from the opposite end radially outwardly.

Preferably as a feature of independent importance the stator includes a plurality of stator surfaces spaced angularly around the axis.

Preferably as a feature of independent importance the stator surfaces are arranged at an angle to a tangent of an imaginary cylindrical surface surrounding the axis.

Preferably as a feature of independent importance the angle of the stator surfaces to the tangent is adjustable.

Preferably as a feature of independent importance the stator surfaces and/or the rotor surfaces are arranged to pivot so as to increase the spacing therebetween to allow the passage of foreign objects between the rotor and stator.

Preferably as a feature of independent importance the stator surfaces are readily removable for replacement when damaged or worn.

Preferably as a feature of independent importance the stator surfaces include one or more fins extending generally around the axis.

Preferably as a feature of independent importance the housing when viewed in plan longitudinal of the axis of the rotor is of polygonal shape to define a plurality of apexes at angularly spaced positions around the axis and the stator surface in plan view includes a plurality of pairs of stator surfaces which form a V shape converging to a respective one of the apexes.

Preferably as a feature of independent importance the rotational speed of the rotor is adjustable to change the number of impacts a seed encounters during its passage.

Preferably as a feature of independent importance the velocity of air along the rotor is adjustable to change the number of impacts a seed encounters during its passage.

Preferably as a feature of independent importance the rotor and the stator are arranged so that the impacts act to move the discarded seeds along the rotor so as to change the position along the rotor at which the impacts of the discarded seeds occurs.

Preferably as a feature of independent importance there is provided two housings each including a rotor and stator arranged side by side across the width of the discharge location.

Preferably as a feature of independent importance each of the housings is rotatable about the axis of the respective rotor to change an angle of the discharge around the axis.

Also disclosed herein there is provided an apparatus for destroying weed seeds for use in a combine harvester where the combine harvester comprises a separation system for separating from harvested crop at a first discharge location feed material including chaff and said weed seeds and at a second discharge location straw, the apparatus comprising:

- a straw chopper section comprising:
  - a chopper housing for mounting at the second location on the combine harvester for receiving from the first discharge location a feed material containing separated straw separated by the combine harvester from harvested crop;
  - a chopper rotor mounted in the housing for chopping the straw for discharge from the housing;
  - and a spreading device onto which the discharged straw is directed;
- and a weed seed destruction section comprising:
  - a housing arranged to be mounted at the first location for receiving from the first discharge location the feed material containing separated chaff and said weed seeds;
  - a rotor mounted in the housing for rotation about an axis and including rotor surfaces thereon for engaging the feed material and for accelerating the feed material in a direction outwardly from the axis of the rotor;
  - a stator arranged at a location along the direction and including one or more stator surfaces for engaging the weed seeds in the accelerated feed material to cause impacts with the weed seeds;
  - wherein the housing includes a discharge opening for discharge of the feed material after the plurality of impacts;
- wherein the straw chopper section and the weed seed destruction section comprise a common unit.

Preferably the common unit includes is a common drive from the combine harvester to the common unit.

That is preferably the weed seed destruction section is driven from the straw chopper section.

Optionally the weed seed destruction section is driven from an intermediate chopper drive shaft or jackshaft in parallel with the drive to the chopper. That is a main drive belt from the chopper drive output pulley of the combine harvester communicates drive to a lay shaft or jack shaft and then two belts communicates in parallel to the horizontal transverse shaft of the chopper rotor and the horizontal transverse drive shaft underneath the two rotors of the weed seed destruction section In the common unit preferably the weed seed destruction section is arranged such that material from the discharge opening can be fed into the straw chopper section.

In this arrangement there are preferably provided two housings each including a rotor and stator arranged side by side across the width of the second discharge location.

In this arrangement preferably each of the housings is rotatable about the axis of the respective rotor to change an angle of the discharge around the axis such that the discharge opening can be directed to the side of the combine away from the straw chopper, towards the guide fins of the tailboard of the chopper, or into the housing of the straw chopper.

In addition to the above defined features, the seed destruction section can include any of the features previously defined.

The arrangement as described hereinafter may provide one or more of the following features and advantages:

To provide a seed destroyer in which the residue does not pass through rotating or stationary rings of objects so that there is less potential for damage on passage of a solid object.

To provide a seed destroyer in which the impacting members of the destructor can be hard surface coated and easily removable for annual replacement and preparation for the next harvest.

To provide a seed destroyer in which the number of hits a seed impacts can be adjusted or tuned for optimum destruction.

To provide a seed destroyer which can allow passage of debris such as rocks and other hard objects without damage or destruction, and has replaceable parts should the object cause damage.

To provide an integrally mounted seed destroyer in which the trajectory of the discharge can be changed from the side of the combine, to the back of the combine tailboard, or into the chopper so that the residue can be spread with the straw.

BRIEF DESCRIPTION OF THE DRAWINGS

One embodiment of the invention will now be described in conjunction with the accompanying drawings in which:

FIG. 10 shows the cross-section of the structure of the rotor assembly and the left side only show the rotor, right side shows the rotor and stator.

FIG. 11 shows the structure of one rotor assembly with one cover removed.

FIG. 14 is an isometric view of the stator frame of FIG. 13 with the replaceable stator components inserted and showing a number of alternative arrangements of the components.

FIG. 15 is an isometric view from below of one rotor of the embodiment of FIG. 16

Figure 17:
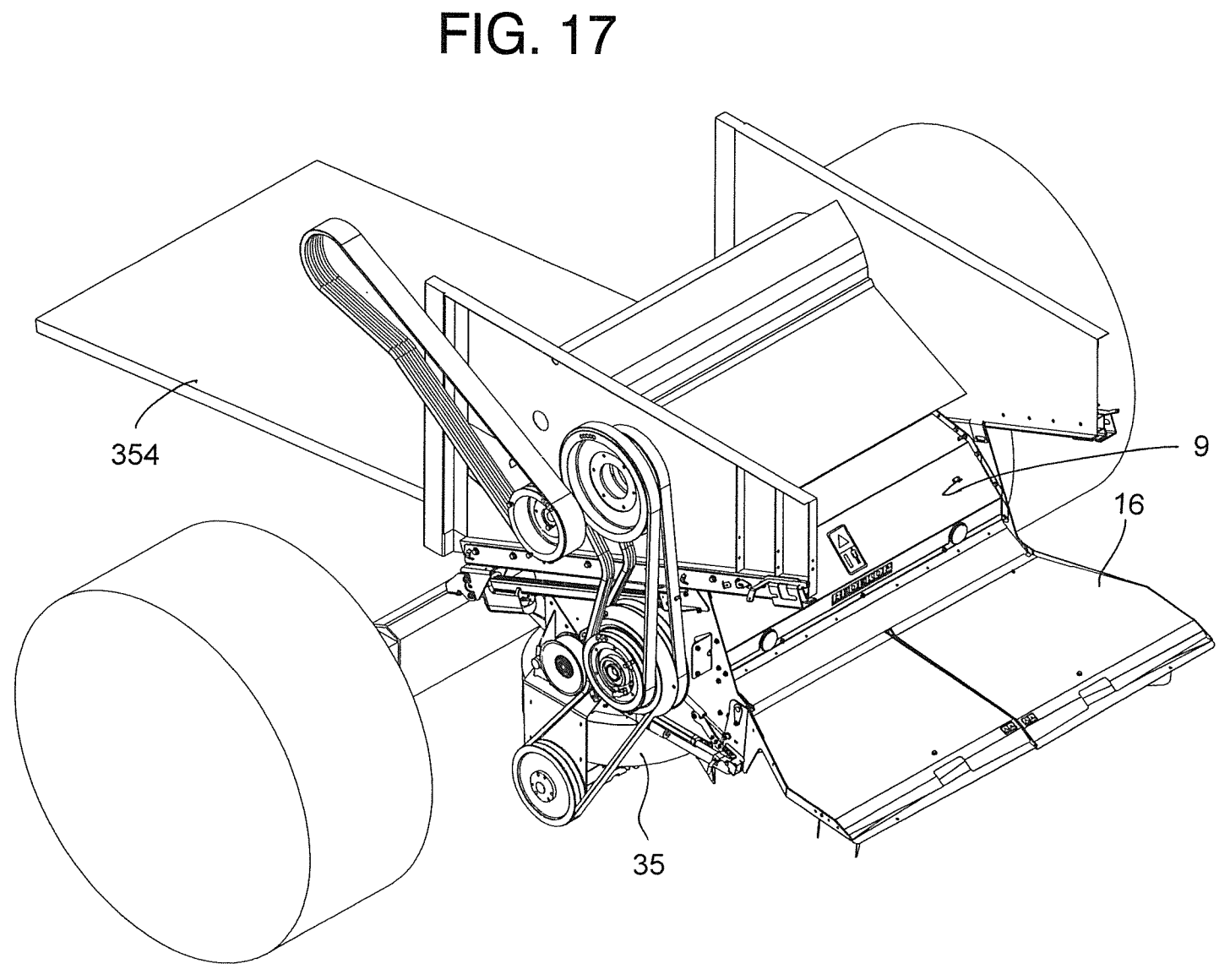

FIG. 17 is an isometric view from one side and the rear of the combined apparatus including the straw chopper section and the weed seed destruction section of the above Figures.

In the drawings like characters of reference indicate corresponding parts in the different figures.

DETAILED DESCRIPTION

Figure 1:
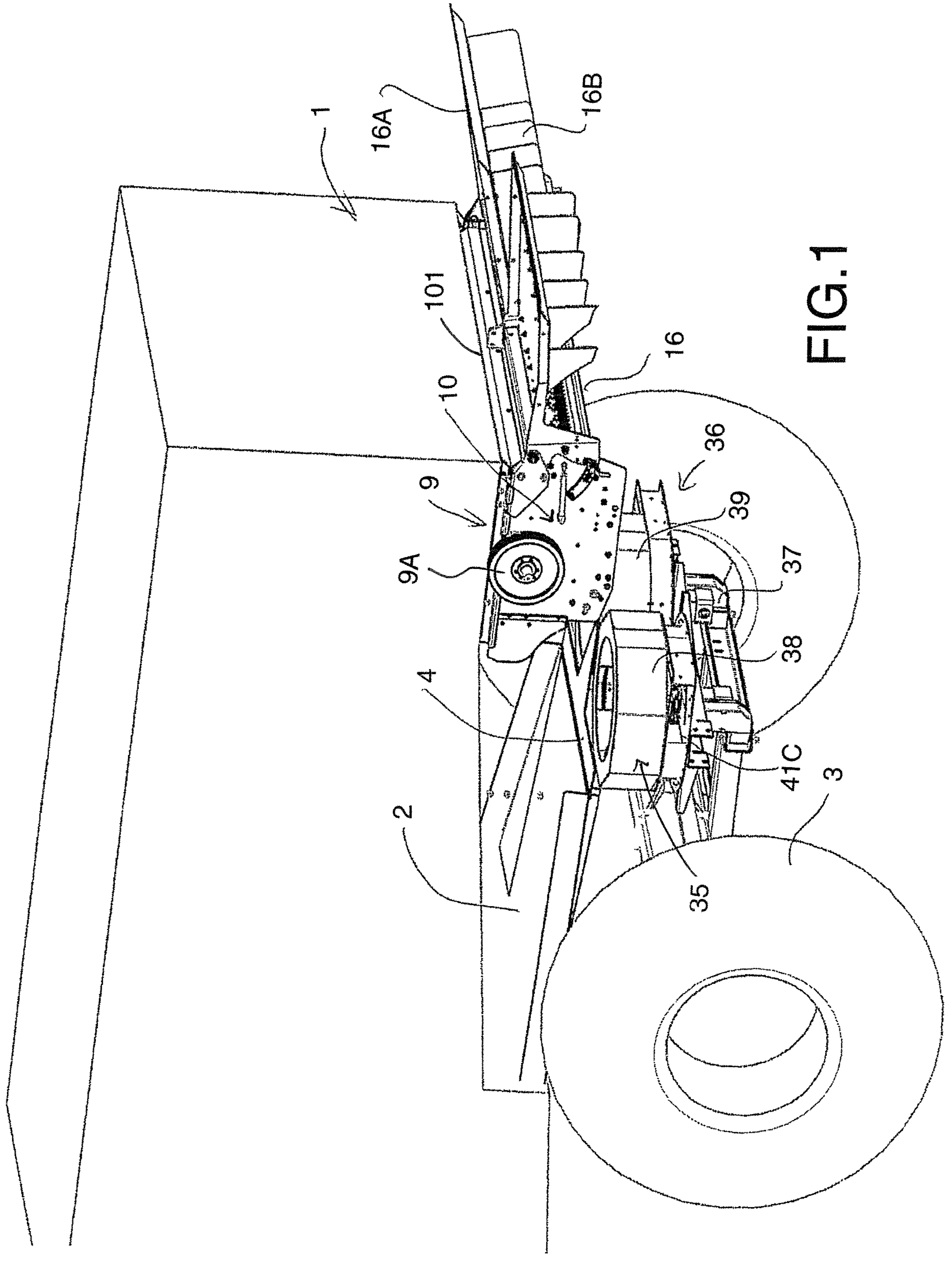
FIG. 1 is an isometric view of an apparatus for destruction of weed seeds according to the present invention which is arranged in a first embodiment where the weed seed destruction section is mounted at a position on a combine harvester at the rear of the sieve so as to discharge the chaff and destroyed seeds away from the straw chopper to both sides of the combine harvester.

The apparatus herein is shown in FIG. 1 mounted on a combine harvester 1 carried on ground wheels 3 and including harvesting components of a conventional nature the rearmost one of which is the sieve 2 which discharges chaff and discarded seeds including weed seeds to the rear edge 4 of the sieve.

Figure 6:
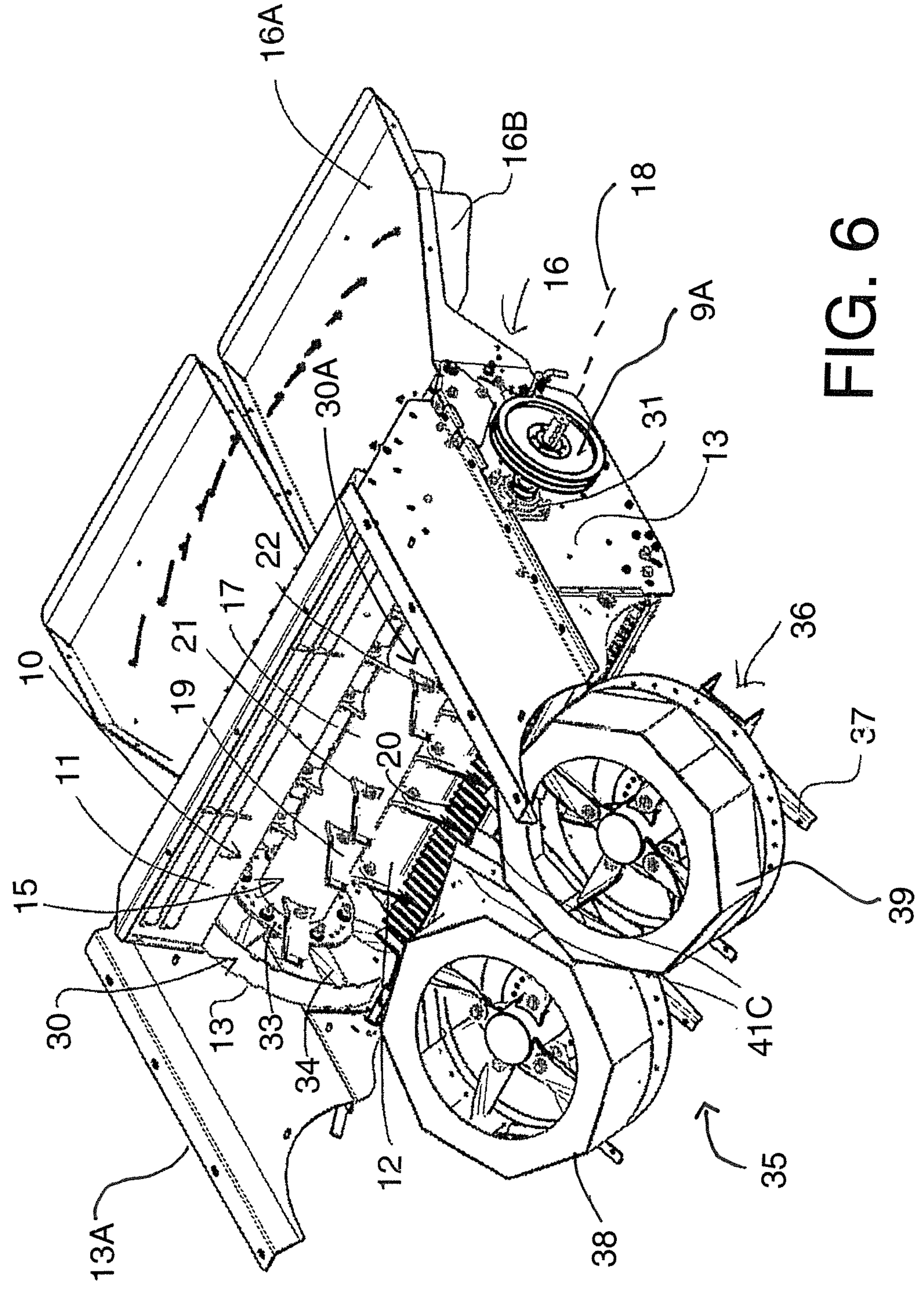
FIG. 6 is an isometric view of the weed seed destruction section according to the present invention which is arranged to feed the discharged material into the chopper rotor of the straw chopper section at the center thereof.
Figure 7:
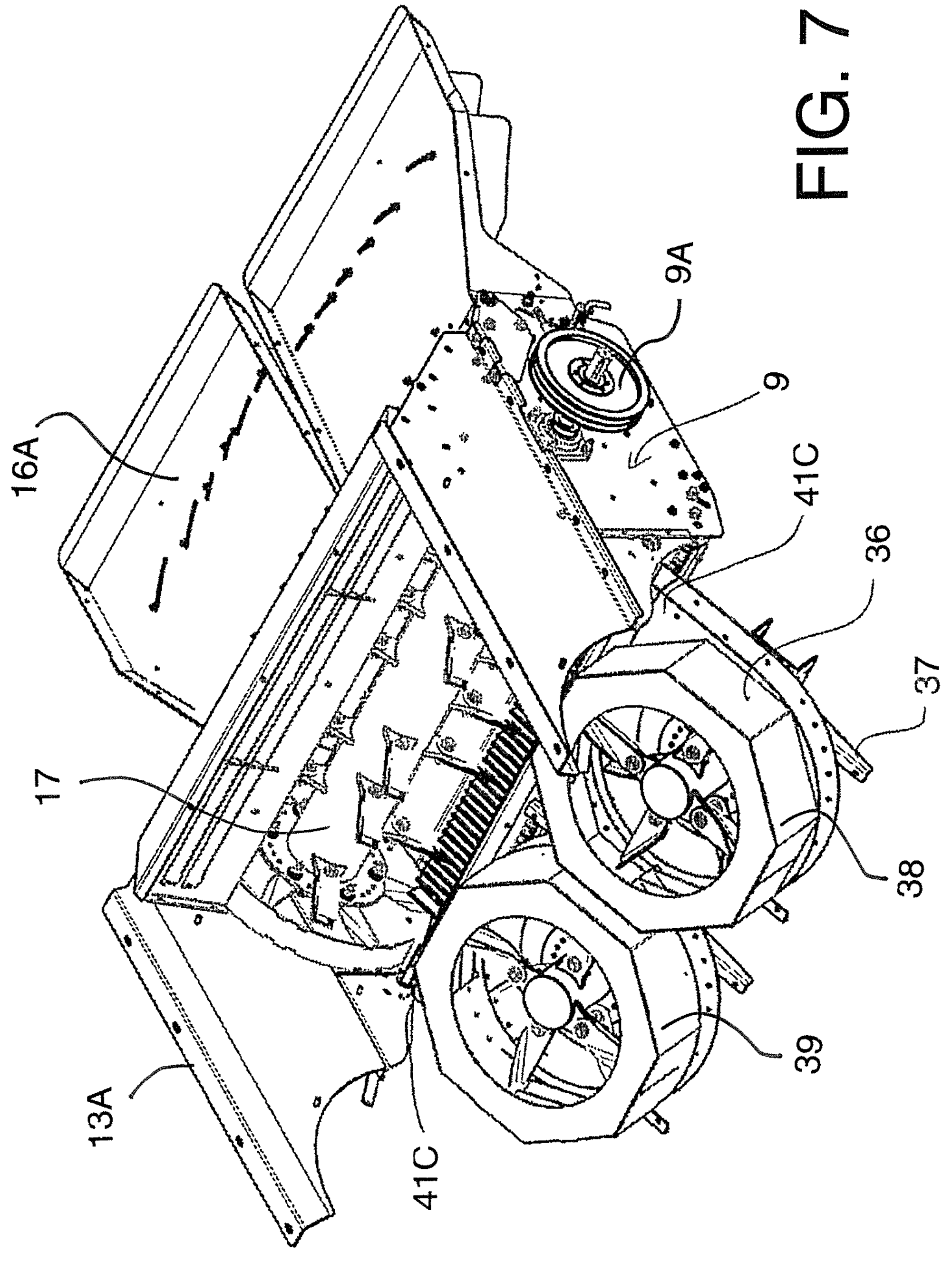
FIG. 7 is an isometric view of the apparatus of FIG. 6 adjusted to feed the discharged material into the straw chopper section at the sides so as to bypass the rotor and feed directly onto the tailboard.

The combine harvester includes a chopper and discharge arrangement 9 shown in FIGS. 1 and 6 is basically as shown in U.S. Pat. No. 6,840,854 issued Jan. 11, 2005 of Redekop, the disclosure of which is incorporated herein by reference. The chopper thus comprises a housing 10 defined by a top wall 11, a bottom wall 12 and two end walls 13. The end walls 13 include attachment means 13A for attachment of the housing to the outlet of a combine harvester for discharge of straw and optionally chaff from the combine harvester into an inlet opening 15 of the housing 10. The bottom wall 12 defines a semi-cylindrical portion extending from the inlet 15 to an outlet 16 through which chopped straw and air is discharged at relatively high velocity for spreading across the field or for transportation into a container.

Within the housing is mounted a hub 17 which is carried on suitable bearings 31 for rotation about a hub axis 18 at a center of the housing so that blade members 19 carried by the hub sweep around within the housing to entrap straw fed through the inlet 15 and to carry the straw and air past stationary blades 20 for chopping and for discharge through the outlet 16. The stationary blades 20 are mounted on the housing at a position approximately midway between the inlet 15 and the outlet 16 so that the blade members 19 sweep between the stationary blades in a cutting action.

The hub 17 carries a plurality of lugs 21 at angularly and axially spaced positions therealong with each lug mounting a pair of blades 19 for pivotal movement of the blade members 19 about a pin 22 parallel to the axis 18. Each of the lugs 21 carries a pair of the blades 19. Each lug 21 is aligned with a respective one of the stationary blades 20 so that each stationary blade has associated with it a respective one of the lugs and thus has associated with it the pair of blades carried by that lug.

In this arrangement of the chopper, there is provided three axially spaced sections of the chopper assembly including a first fan section 30 at one end of the hub 17 and the second fan section at the other end of the hub 17. In-between the two narrow fan sections 30 is defined a center section 30A which provides the whole of the cutting action.

Within the center section 30A all of the blades 19 are formed with a cutting edge lying in a radial plane of the axis. The blades are preferably of the conventional flat blade type with a leading and trailing chamfered edge. Thus each of the two cutting blades 19 in the center section can pass closely on either side of a respective one of the stationary blades 20. Thus the stationary blades can be spaced by a distance which is just sufficient to allow the passage there between of the preferably flat cutting blade. In the preferred arrangement, the spacing between the stationary blades is thus small in that the stationary blades are not sufficiently spaced to allow the passage there between of a fan type blade.

In the fan sections 30, there is provided a ring 33 which is mounted on the hub 17 at a respective end of the hub. The ring thus surrounds the cylindrical wall of the hub and stands outwardly therefrom just beyond the end of the center section defined by the stationary blades and the blades 19 carried on the hub.

The rings 33 each carry a plurality of fan blades 34 at spaced positions around the ring. The fan blades 34 are arranged thus so that each follow directly behind the next at the same axial location.

Figure 3:
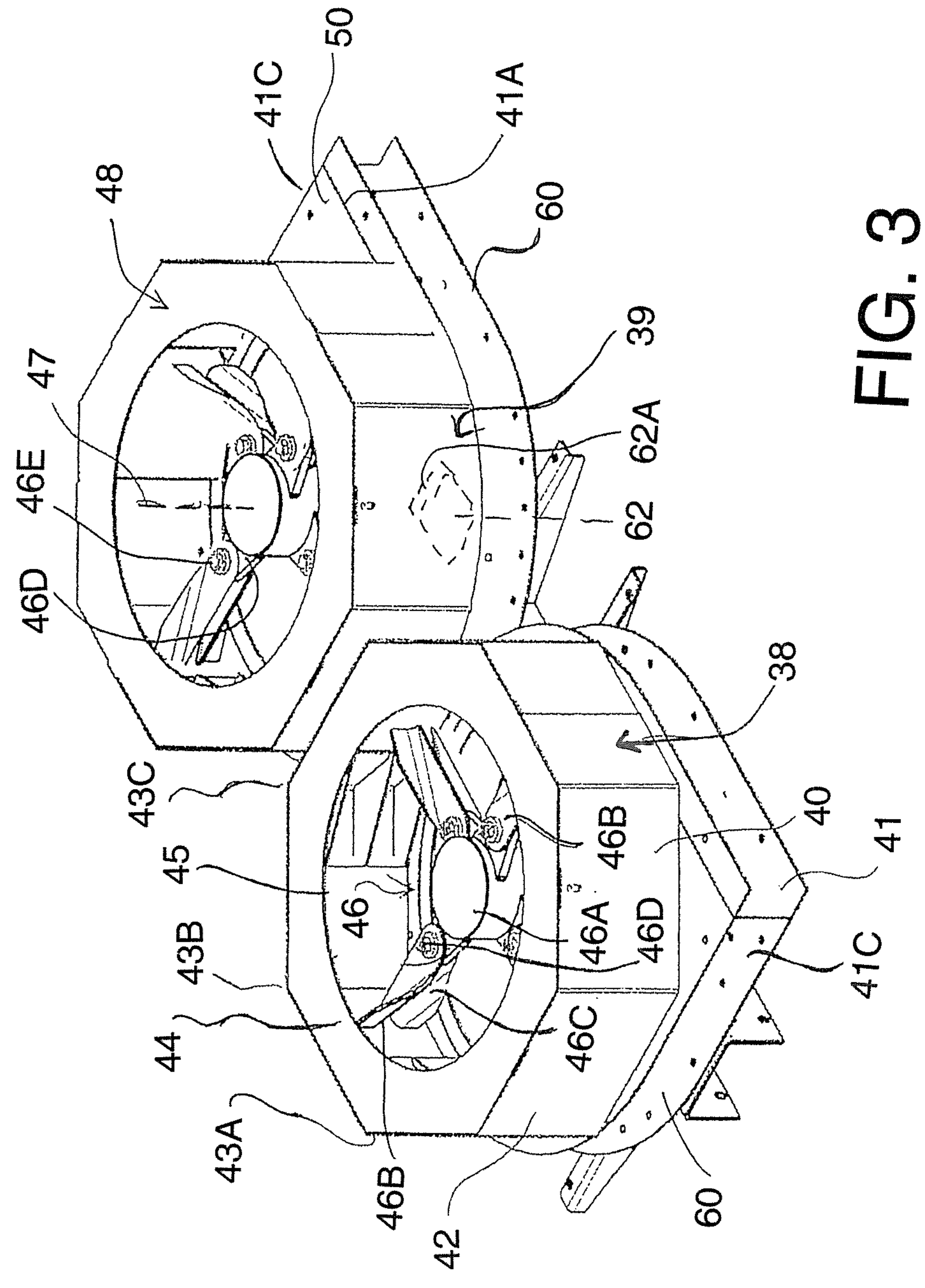
FIG. 3 is an isometric view of the weed seed destruction section of FIG. 1 separate from the combine harvester with the discharge housing arranged for discharge to the sides.

Each of the fan blades 34 is bent with a fan blade portion so that each of the fan blades is of the shape shown in FIG. 3 of U.S. Pat. No. 5,482,508 of Redekop, the disclosure of which is incorporated herein by reference. However the fan blades 34 do not necessarily have a sharpened leading edge since there is intended to be no cutting action in the fan section. Thus the fan blades are spaced from the end most stationary blade 19 so that in effect no cutting action occurs in this section.

The bent fan blade portion stands outwardly to one side of the flat plate portion of the fan blade 34. The fan blade portion which is bent at right angles to the main body of the fan blade is maximised in dimension so that it may be rectangular. This large blade area together with the presence of the six blades provides a large fan blade area which generates a significant air flow.

The fan blade portion is inclined forwardly and outwardly so that at a regularly outer position toward the outer end of each fan blade the fan blade portion is angularly advanced relative to its position closer to the axis of the hub. This incline outwardly and forwardly significantly increases the air flow effect driving the air in the greater volume and at higher speed radially from the fan section and outwardly of the exit 16.

Preferably the fan section comprises only a single row of the six fan blades but in some cases an additional row or rows may be provided although this is not preferred. The fan blades are arranged immediately adjacent the end walls 13 so that they take up minimum space at the end of the chopper assembly. It will be appreciated that the intention is to provide maximum air flow in the fan sections while taking up minimum dimensions so that the maximised chopping effect to provide shortest material is achieved within the center section using the flat blades.

The above arrangement of straw chopper section is one example only of arrangements which can be used herein.

The chopper and spreading assembly 9 is arranged to be mounted at a rear straw discharge 101 of the combine harvester 1 and includes the housing 10, the rotor 17 mounted in the housing 10 for rotation around a generally horizontal axis and carrying the plurality of chopper blades 19 for chopping the discharge material.

At the exit 16 is provided the material spreading assembly which can be the form of a tailboard 16A with guide fins 16B for receiving the chopped material and spreading the material to the rear and sides of the combine harvester.

An apparatus 35 for destroying seeds comprises a body 36 carried on a frame 37 mounted at a suitable location on the combine harvester by mounting arrangements of a conventional arrangement. The body provides two side by side housings 38, 39 each located adjacent a respected half of the discharge location the feed material containing separated chaff and discarded seeds separated by the combine harvester from harvested crop. In the embodiment shown in FIG. 1, the housings are located at the rear edge 4 of the sieve 2.

Figure 4:
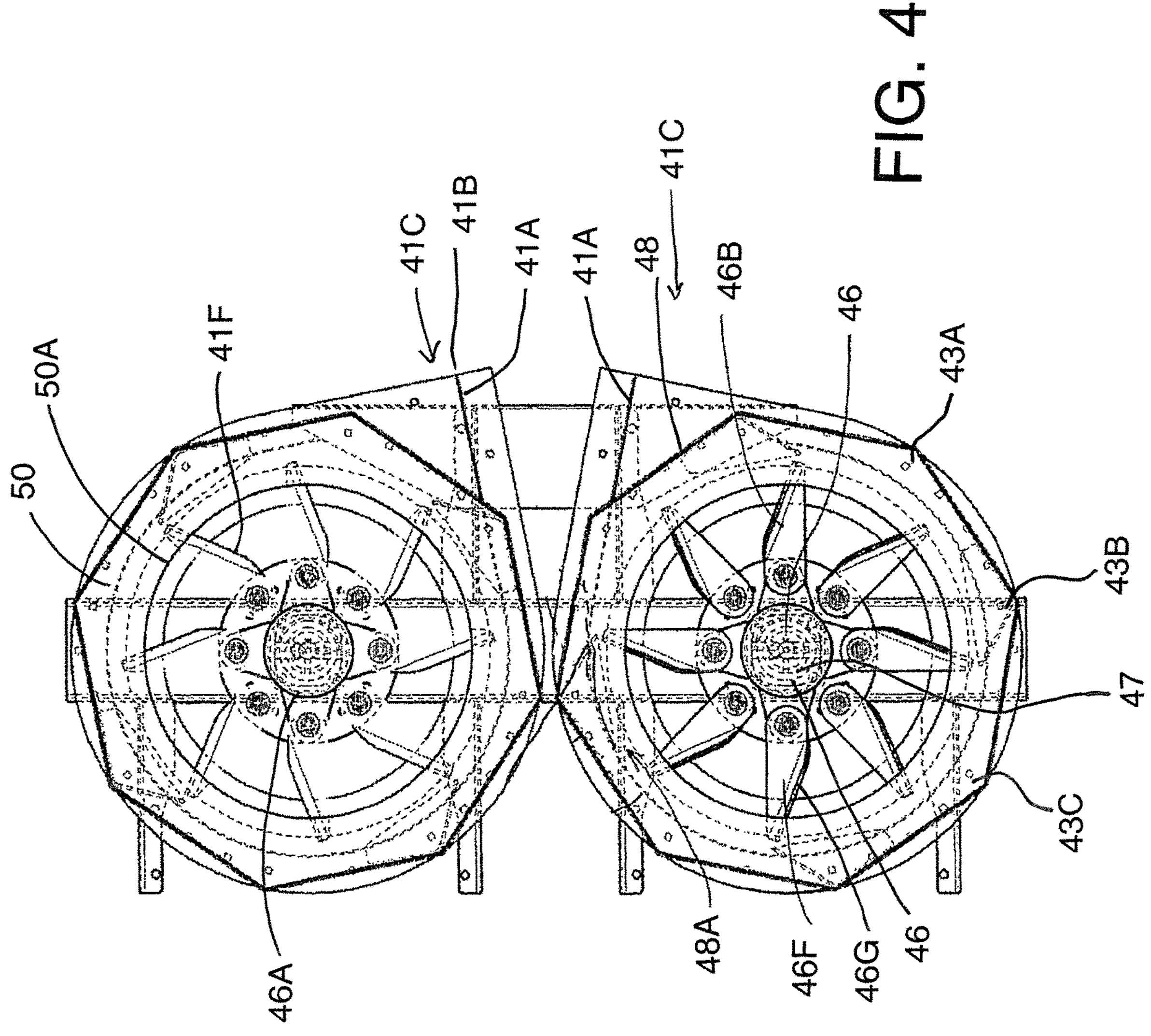
FIG. 4 is a top plan view of the weed seed destruction section of FIG. 3 separate from the combine harvester with the discharge housing arranged for discharge to the rear.
Figure 5:
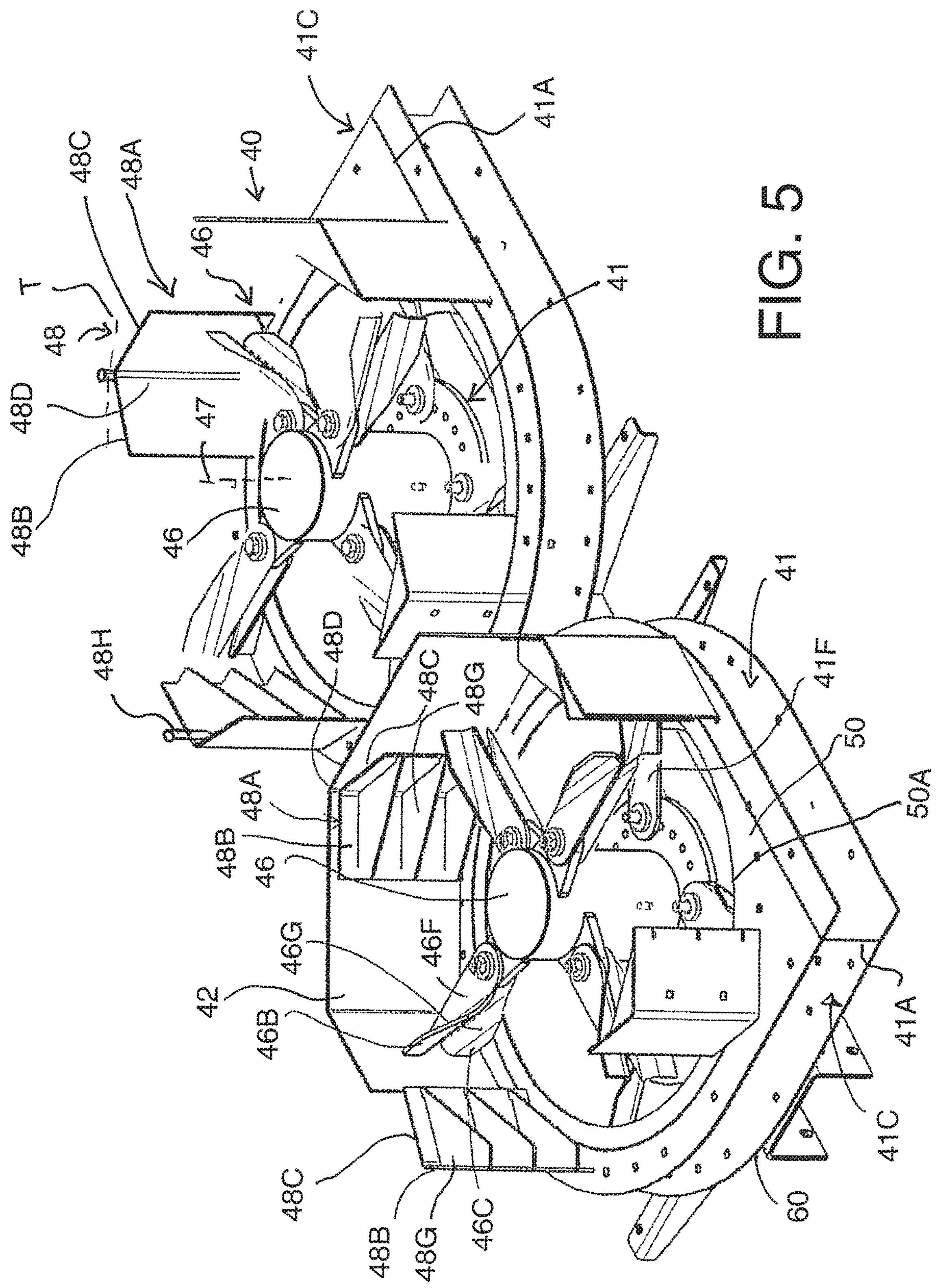
FIG. 5 is an isometric view of the weed seed destruction section of FIG. 3 with a part of the housing removed.

Each of the housings, as best shown in FIGS. 3, 4 and 5 includes an upper impact section 40 and a lower fan section 41. The upper section 40 includes a housing 42 which is polygonal (in this example octagonal) in plan view with apexes 43A, 43B, 43C etc. The housing 42 incudes a top wall 44 connected to the polygonal side wall and defining a circular opening 45 arranged to be mounted at the discharge location of a combine harvester for receiving from the sieve the chaff and discarded seeds including the weed seeds.

A rotor 46 is mounted in the housing for rotation about an upstanding axis 47 at right angles to a bottom base of the housing axis. The rotor includes a cylindrical hub 46A carrying upper and lower sets of blades 46B and 46C. The sets are spaced axially. The individual blades of the set are spaced angularly. The sets are carried above and below respectively a series of angularly spaced lugs 46D on pins 46E so as to act as blades.

Each blade includes as best shown in FIG. 5 a base plate 46F lying in a radial plane and a blade portion 46G turned out of the radial plane so as to act as a fan blade to drive entrained air and the material centrifugally outwardly from the axis of the rotor.

Thus the rotor includes components thereon defined by the two sets of blades for engaging the feed material and for accelerating the feed material in a centrifugal direction away from the rotor.

In the housing around the rotor is provided a stator 48 defined by the inside surface of the polygonal housing 40 and arranged at a location centrifugally outside the rotor 46 so that the material and discarded seeds thrown outwardly impact on the stator. The stator includes a series of surface elements 48A for engaging the discarded seeds in the accelerated material and arranged such that the discarded seeds impact thereon and rebound therefrom back toward the rotor.

Thus the rotor 46 and stator 48 are arranged such that the discarded seeds rebound back and forth between the rotor 46 and the stator 48 to provide a plurality of impacts on the feed material to destroy the seeds.

The housing includes a discharge opening defined by a circular inner edge 50A of a plate 50 lying in a radial plane of the housing between the impact section 40 and the fan section 41. Thus the bottom of the impact section is defined by the bottom plate 50 so that air and the entrained material is directed downwardly into the fan section for discharge of the feed material after the plurality of impacts. As the air and entrained material passes downwardly, the discarded seeds discharge from the rotor and do not pass or escape outwardly through the stator 48. That is the stator wholly or substantially wholly surrounds the rotor section to prevent the seeds from escaping radially. That is all of the seeds are rebounded back inwardly to the rotor and move downwardly while rebounding back and forth until they pass out of the impact section at the bottom through the hole 50A in the plate 50 into the fan section 41.

Thus the rotor 46 rotates around the axis 47 so as to direct the discarded seeds centrifugally outwardly. The stator 48 surrounds the axis 47 so as to rebound the discarded seeds back toward the axis and the discharge opening is arranged such that the discarded seeds discharge axially from within the stator. In this way, the feed material containing the discarded seeds enters the housing axially of the rotor at the top end and discharges axially from the bottom end of the rotor into the fan section, where the material is accelerated radially outwardly into a channel defined by a peripheral wall 41A which spirals gradually outwardly from a leading edge to a trailing edge 41B so as to define an outlet location 41C.

Thus the fan section 41 shown in plan in FIG. 4 at the top includes a series of blades 41F carried on the rotor 46A underneath the plate 50 so that the fan components act for driving the discarded seeds from the opposite or bottom end of the rotor 46 radially outwardly to the discharge opening 41C at the trailing edge 41B.

As best shown in FIG. 5, each of the stator surfaces 48A comprises a generally V-shaped body with two walls 48B and 48C converging to an apex 48D which is located at one of the apexes of the polygonally shaped housing. In FIG. 5 is shown one of the stator surfaces 48A and it will be noted that the wall 48C against which the seeds are primarily directed as the rotor 46 turns clockwise is arranged at an angle to a tangent T of an imaginary cylindrical surface surrounding the axis. Thus the surface 48C is inclined forwardly and inwardly so that the seeds moving with the rotor and outwardly of the rotor impact against the surface 48C and are rebounded inwardly. The stator surface portion 48A is mounted at the apex 48D by a hinge pin 48H which allows the angle of the stator surface 48C to the tangent T to be adjustable to change the level of aggression in the rebound action.

Also the hinged mounting of the stator surface portion 48A allows the stator surfaces to pivot to allow the passage of foreign objects between the rotor 46 at the outer tip of the blades 46B, 46C and stator as defined by the surface portions 48A. Also the stator surface portions are readily removable for replacement by pulling the support pin 48H when damaged or worn.

Also the stator surface portions 48A include one or more fins 48G lying in a plane at right angles to the walls 48B, 48C and thus extending in a radial plane around the rotor. The stator has an octagonal shape and there are four of the stator surface portions 48A at four of the apexes of the polygon leaving the remainder of the inner surface of the octagon exposed to act as the stator surface. This stator surface surrounds the whole of the rotor and hence prevents outward escape of any material, thus confining the material to move downwardly into the fan section for ejection.

Figure 8:
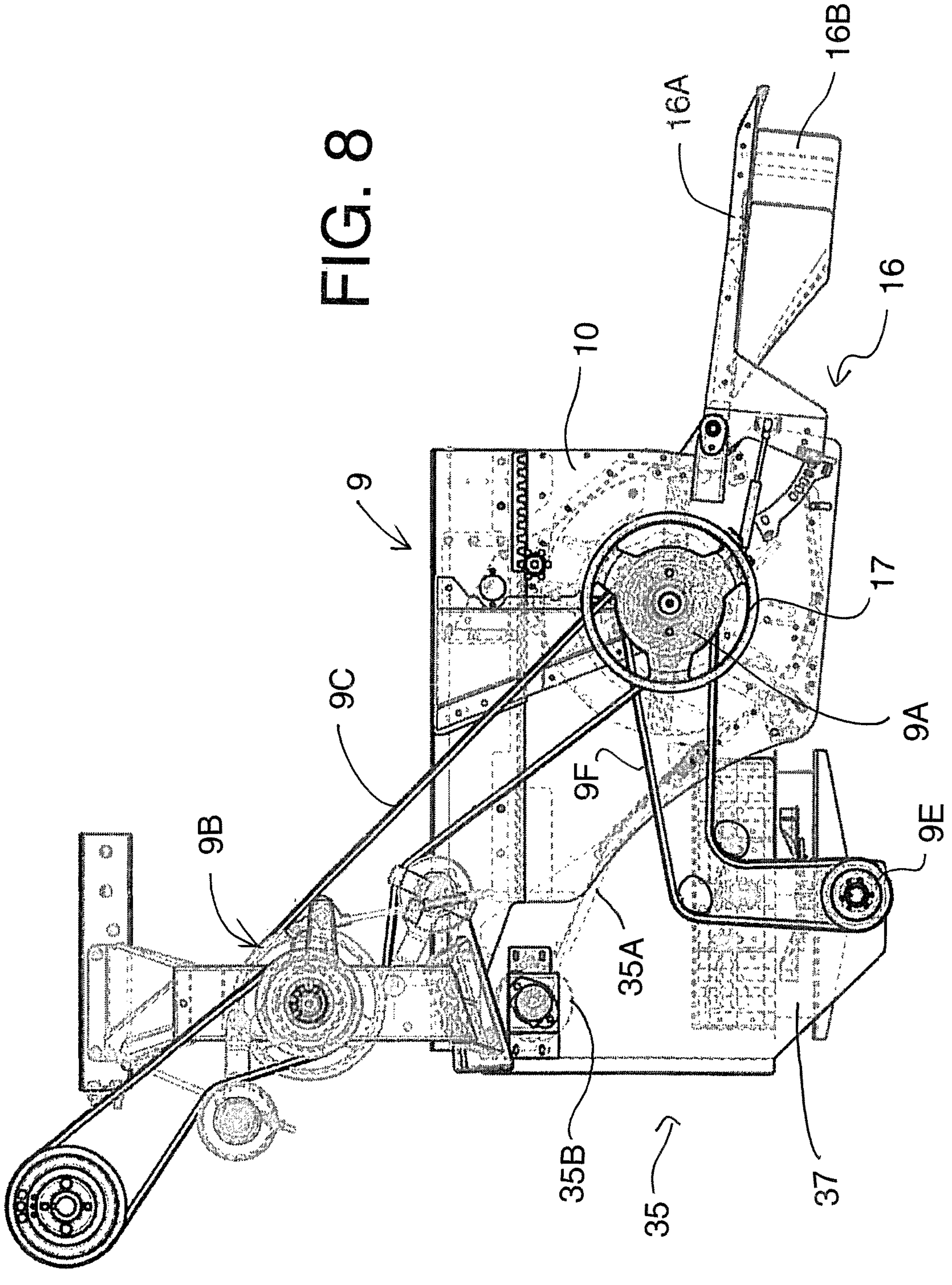
FIG. 8 is a side elevational view of the apparatus of FIG. 2 showing the drive system to the combined apparatus including the straw chopper section and the seed destructor section.

The rotor 46 which carries both the blades of the impact section and fan blades 41F of the discharge fan section 41 as best shown in FIG. 8, is driven by a hydraulic drive motor 46H, the rotational speed of which is adjustable to change the speed of the impact blades and thus the number of impacts a seed encounters during its passage.

Also the velocity of air along the rotor through the impact section from the opening at the top plate 44 to the discharge plate 50 is adjustable to change the number of impacts a seed encounters during its passage.

The rotor and particularly the stator are shaped and arranged so that the impacts and rebounding action act to move the discarded seeds along the rotor from the feed opening at the top plate 44 to the discharge opening at the plate 50 so as to change the position along the rotor at which the impacts of the discarded seeds occurs. Thus the seeds as they rebound back and forth move through the impact section at a rate depending on the shape and position of the stator surfaces and depending on the rotation rate of the rotor and the air speed through the impact section.

In a typical walker style combine there is a large space between chopper 9 and the end of the sieve 2. In this case the seed destructor 36 is mounted at the end of the sieve 2. In this position, the discharge openings 41C of the fan section 41 are located by rotating the housings 38, 39 so that the seed destructor discharge is set to the side because the discharges are not close enough to the chopper 9 to allow feeding into the chopper.

The seed destructor is made up of two rotating drums or rotors 46 within the housings 38 and 39 rotating in opposite directions. The housings are rotatably mounted on the frame 37 so that the discharge 41C can be pointed in the direction required. Although this is shown as a fixed mounting it could be easily designed as a movable mounting so the operator could change it quickly as desired. In one arrangement the adjustment can be obtained conveniently by rotation of the housing around the axis of the rotor.

The impact section 40 contains in the stator 48 replaceable, adjustable impact plates or surface portions 48A, in which the residue that is dropped into the seed destructor housing is flung against by the rotors 46 with blades 46B and 46C. The residue is deflected back by the stator into the rotating blades for another hit.

The fan section 41 at the bottom of the housing acts to accelerate the residue for spreading back onto the field or into the chopper or into the chopper fins as desired.

The rotors can be driven by hydraulic motors which power and mount the rotating hubs 46 in which case the motors are mounted to the frame 37.

The impact plates 48A are rotatably adjustable at the apex 48D and designed to deflect the residue back into the high speed blades. The guide fins 48G on the impact plates serve to control the angle that the residue is deflected and therefore the number of times the residue rotates in the housing and thus the number of hits a seed encounters in its passage through the destructor. The impact plates 48A are replaceable and are hard surface coated for a longer life.

At the bottom of the housing assembly below the fan section 41 is provided a bottom plate 60 closing the bottom of the fan section 41 below the plate 50. In the plate 60 is defined an air inlet schematically indicated at 62 which regulates the flow of exterior air into the fan section through the plate 60. The opening size of the air inlet 62 can also be varied by an adjustment 62A. As the adjustment 62A control the amount of air entering into the fan section, this adjustment increases or reduces the amount of air drawn through the opening 50A in the plate 50 and thus also serves to change the speed of the residue flowing through the assembly. The air inlet 62 can be regulated so that, as it is closed off, the speed of the residue flow increases, to the point when closed, all air is sucked in from the top of the assembly at the plate 44, to be discharged with the fan in the discharge zone 41. When entirely opened the majority of the air is drawn from the bottom plate 60 of the assembly and the speed of the residue flowing through the assembly is reduced allowing for more impacts.

A third method to adjust the number of impacts a seed encounters through the assembly is of course with the speed of the rotor 46. The drive system to the rotor can be controlled by the combine or by a separate driver operated control and the speed of the assembly can be increased or decreased depending on factors such as seed size, residue toughness, or residue size including factors such as corn cob size and moisture content or sunflower head size.

In a preferred arrangement, the seed destructor section 36 is integrated into the chopper 9 as a common unit with the chopper 9. In this arrangement the seed destruction section 36 acts two receive all residue from the sieves. The weed seeds are destroyed in the seed destructor and can be ejected into the chopper for spread with the straw residue on the tailboard 16A.

In this arrangement the combination of all of the residue from both the sieves and the straw exit into the chopper allows the destroyed seeds and chaff residue to mix with the straw residue and be spread in a much wider spread pattern. That is in FIG. 6, the discharge openings 41C from the fan section 41 of the seed destruction section 36 are turned on the frame 37 so that they are directed to the center of the inlet 12 of the chopper 9.

Alternatively the chaff residue and destroyed seeds expelled from the seed destructor at the discharge openings 41C is expelled at the sides of the chopper at the fan sections 30 so as to bypass the center chopper section of the chopper so as to be directed by the chopper into the fins of the chopper for mixing on the tailboard 16A and spreading with the straw residue from the chopper.

As a third option, the discharge openings 41C can be positioned to the side to spread to the side of the combine as shown in FIG. 1. Thus the seed destruction section 36 is a part of or closely associated with the chopper 9. However the position of the outlet in the embodiment of FIG. 20 can be adjusted to the side in the same manner by rotation of the housings on the frame 37.

Thus the destruction section 36 and the chopper 9 form a common unit which can be supplied as a common assembly for attachment to the combine harvester. The common unit may include a common frame. The common unit can include a common drive arrangement by which a single output drive from the combine harvester is directed to the common unit and then directed by the drive mechanism to the chopper rotor and to the seed destruction section. The common unit can be arranged so that in one or more adjustment positions of the seed of destruction section the output from the fan section is directed into the chopper for common distribution into the field. It is also possible in this arrangement that the seed destruction section be adjusted so that the output therefrom is directed into the field bypassing the chopper.

In an arrangement where the space between the sieve 2 and the straw outlet is greater than can be accommodated by direct feed from the sieve into the inlet of the seed destruction section, a feed duct or other transfer arrangement can be provided.

Thus the combined apparatus comprises the straw chopper 9 as described above together with the apparatus for destroying weed seeds as described above where the discharge opening of the housing is arranged such that the discharge opening can be directed to the side of the combine away from the straw chopper, towards the guide fins of the tailboard of the chopper, or into the housing of the straw chopper.

Figure 9:
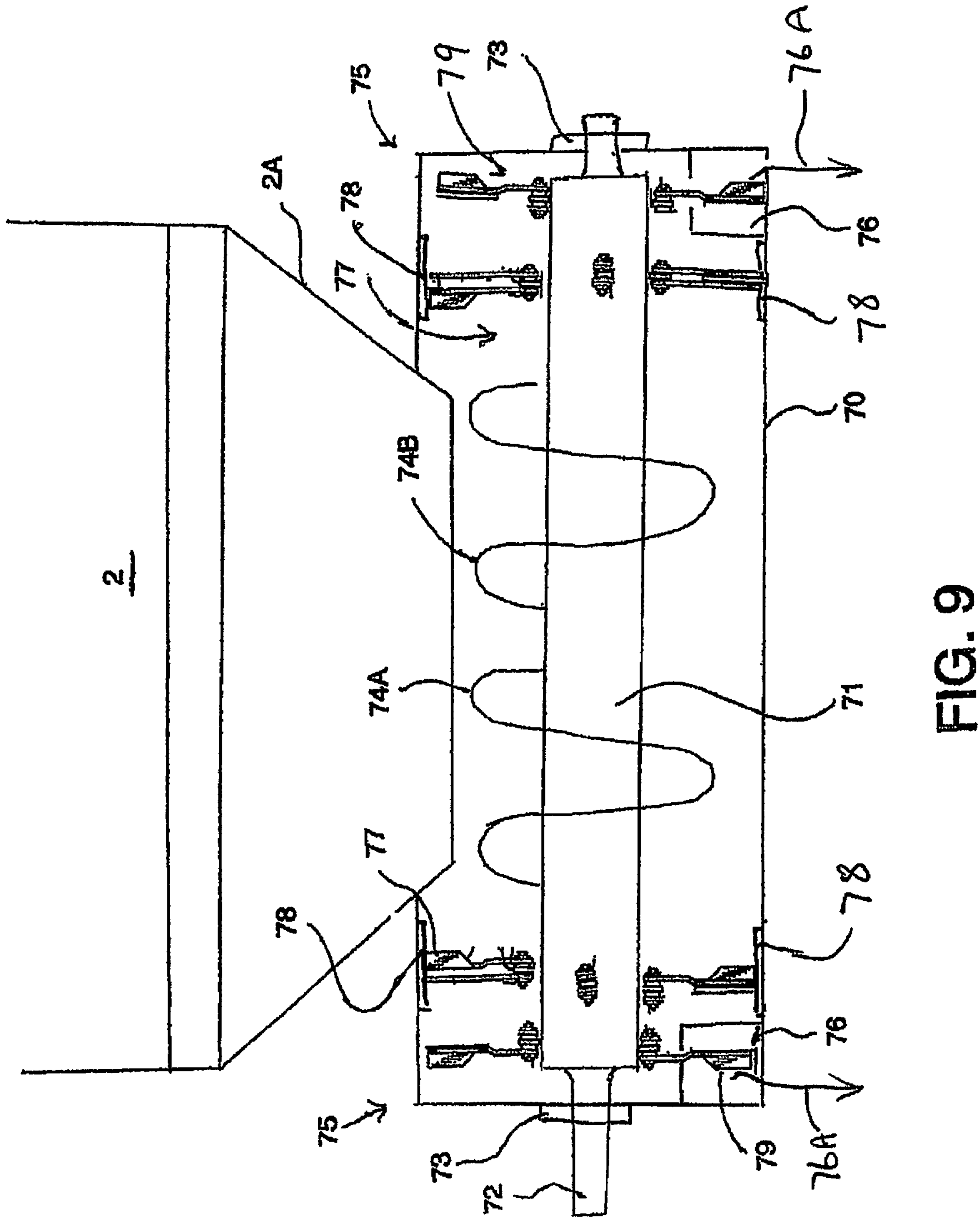
FIG. 9 is a plan view of an alternative arrangement of the weed seed destruction section where the rotors are arranged to rotate about a horizontal axis and thus rotate in a vertical plane to discharge rearwardly.
Figure 10:
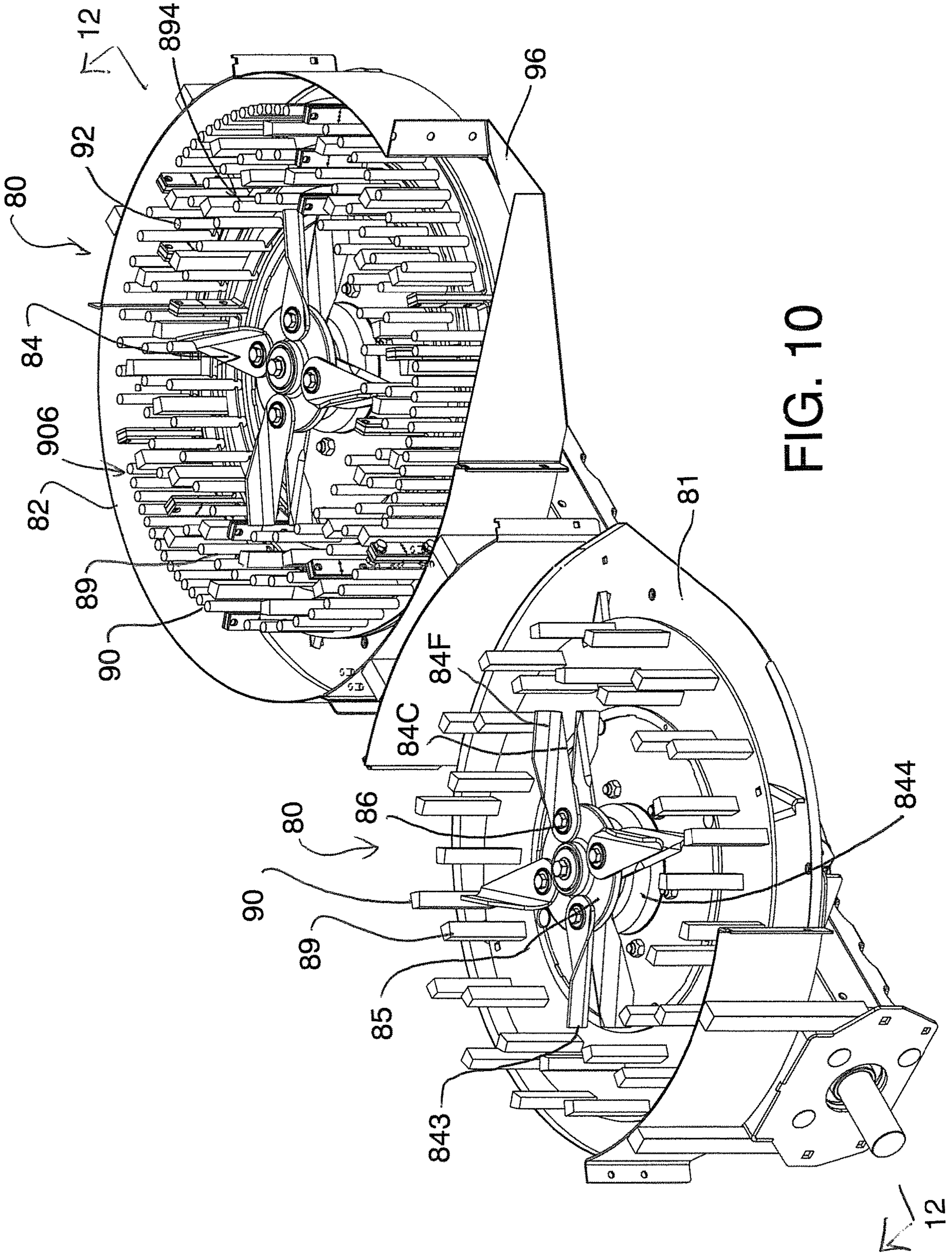
FIG. 10 is an isometric view of another embodiment of an apparatus for destruction of weed seeds according to the present invention where

As an alternate embodiment shown in FIG. 9 the apparatus forming the weed seed destructor section can be designed as a horizontal tube or duct 70 forming an elongate housing into which the material is fed from the sieve 2 by a feed duct 2A. This can be readily located at this position by a combine manufacturer as a horizontal duct in their combine at a position ahead of the rear discharge for chaff.

The duct 70 contains a transverse shaft 71 driven at one end 72 and carried on end walls of the duct 70 at bearings 73. The shaft carries auger fighting 74A, 74B divided in the middle so as to move chaff axially along the housing from the inlet at the duct 2A outwardly to each respective end of the horizontal rotor defined by the shaft 71 and flighting 74A, 74B. The arrangement thus provides seed destructors 75, corresponding to seed destructors 36, symmetrical to and operating in the same manner as that previously described but arranged in an orientation at 90 degrees to that shown previously and rotating in a vertical plane about a horizontal axis defined by the shaft 71. Thus the destructor 75 includes a rotor 77 and stator 78, corresponding to the rotor 46 and stator 48, as previously described and a fan section 79, corresponding to the fan section 41 as previous described. The fan section 79 communicates with a discharge zone 76, corresponding to the outlet location 41C, which is located at the end of the rotor 77 to expel the chaff and weed seeds after treatment along direction 76A into a secondary spreading device, or into a straw chopper or into the tail board fins of the straw chopper. The auger flightings 74A, 74B and the rotor 77 and the fan section 79 thus form the horizontal rotor defining a generally cylindrical body within the tube or housing 70.

Figure 2:
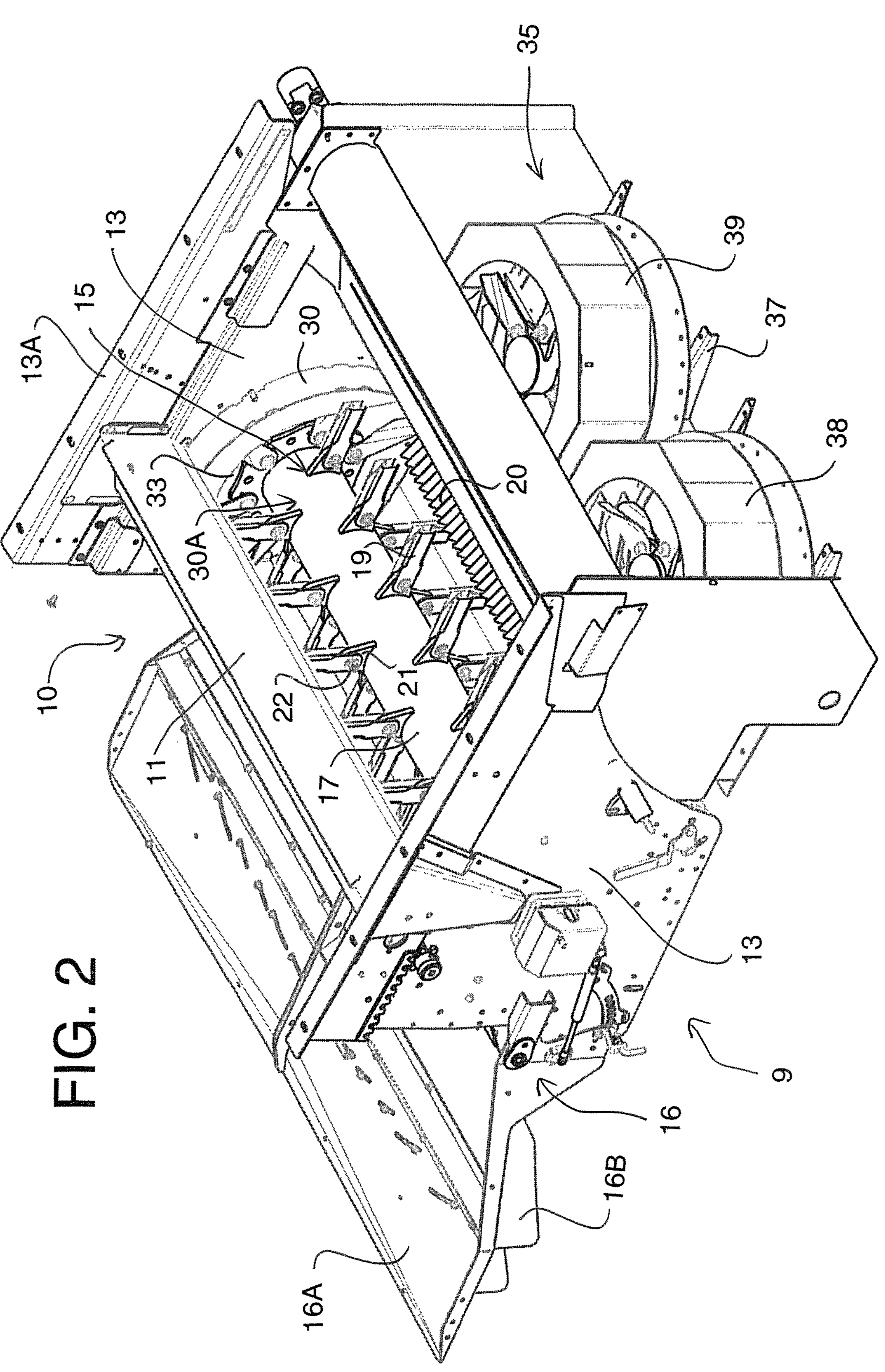
FIG. 2 is an isometric view from the front and one side of the combined apparatus including the straw chopper section and the weed seed destruction section of FIG. 1.
Figure 2A:
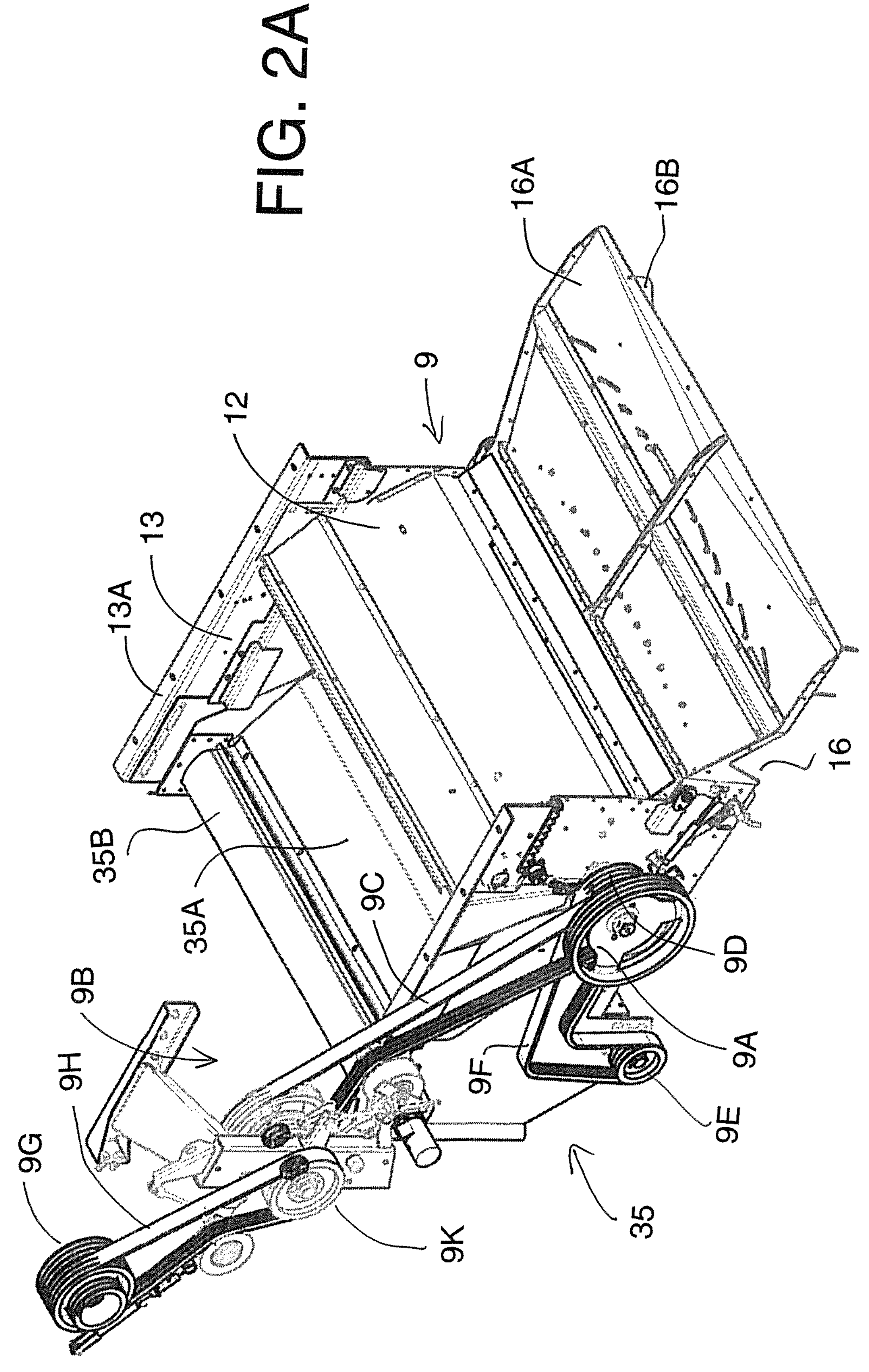
FIG. 2A is an isometric view from the rear and the other side of the combined apparatus including the straw chopper section and the weed seed destruction section of FIG. 1.

As shown in FIGS. 2A and 8 housing of the chopper section 9 and the seed destructor section 35 are formed as a common or integral construction coupled together as single or common unit which can be mounted on the combine harvester at the rear of the combine so as to be associated with the rear straw discharge and the rear chaff discharge.

The chopper 9 has an input drive pulley 9A connected to the rotor 17 driven by a belt 9C or other drive component or pulley assembly 9B from the combine. In addition the pulley 9A of the chopper drives an output pulley 9D which communicates drive to the seed of destruction section 35 through a pulley 9E driven by a belt 9F. In the arrangement shown the pulleys 9A and 9D are mounted at the same end of the rotor 17 but this is not essential. The drive 9B to the chopper can be as shown where the output shaft 9G of the combine drives a belt 9H connected to a pulley system 9K to drive the belt 9C; but of course other drive arrangements can be used such as a shaft from an output gearbox.

A shroud or hood 35A is over the seed destructor section to allow for the chaff to be directed underneath the hood into the seed destructor. A roller 35B is required at the leading edge of the hood 35A to eliminate material buildup on the leading edge which could cause possible plugging. The roller rotates in a clockwise direction at 200-500 rpm to roll any long straw over to the chopper section 9 while the chaff and weed seeds flow under the hood the destructor section 35.

While the arrangement shown herein is shown as an externally mounted chopper carried on the combine harvester at the rear straw discharge, some combines include an internal chopper mounted in the housing at a position in advance of the rear discharge. In this arrangement the seed destructor section can be located at the chaff discharge and arranged to direct material into the internal chopper or away from the internal chopper to the ground. In this case the internal chopper does not cooperate directly with a spreading system such as a tail board.

Turning now to FIGS. 10 to 16, there is shown a modified embodiment of the seed destructor which includes two separate destructor elements side by side each including a housing 80 with base 81 and a spiral outer surface 82 upstanding from the base and extending to an outlet or discharge mouth 96. The base and outer surface are covered by a top planar cover panel 801 which has an opening 83 Inside a center part of the spiral which defines a central inlet for feeding the material from the sieve containing the chaff and weed seeds onto a rotor 84 mounted on a hub 85. Around the hub 85 is provided a plurality of pivot pins or bolts 86 each carrying a pair of flail blades 87. The blades extend from an inner end with a plurality of fingers extending into connection to the pin 86 between a plurality of disks 844 of the hub 85. An outer end of the blade 85 broadens in the axial direction of the axis of the hub as shown at 842 and terminates in an edge 843 lying in an imaginary cylindrical surface surrounding the axis. The blades can retract inwardly by pivotal movement in the event of impact with a larger object. Thus the blades are pivotally mounted about an axis parallel to the rotor axis so as to act as flails. Also each of the rotor blades includes a sharpened cutting edge 84C radial to the axis and a fan blade portion 84F generally axial of the axis so that the blades are of a similar construction to those used in the chopper and described above.

Around the rotor is provided a stator formed by two stationary annular coaxial cylinders 89 and 90 with cylinder 89 inside the cylinder 90. The stator cylinders are carried on the base 81 so as to stand upwardly therefrom or they may be attached to the top cover so that they hang down from an upper annular flange 891 fixed to the cover. Shown in FIG. 12 a seal 201 is provided to limit the passage of weed seed from the central inlet to the outlet through the clearance between the rotor and stator. The sealing ring 201 forces the weed seeds to contact the stator and rotor thus devitalizing the seed.

The base 81 is carried on a beam 811 which mounts the two destructor elements side by side and provides drive through an input shaft 812 and two gear boxes 813, 814 to the upstanding shafts 81X driving the hubs 85. The cover 801 is rigidly fixed and centered on the beam 811 so as to hold the stator in fixed coaxial relationship with the rotor against movement which could allow interference between the rapidly rotating rotors and the stator cylinders.

Figure 13:
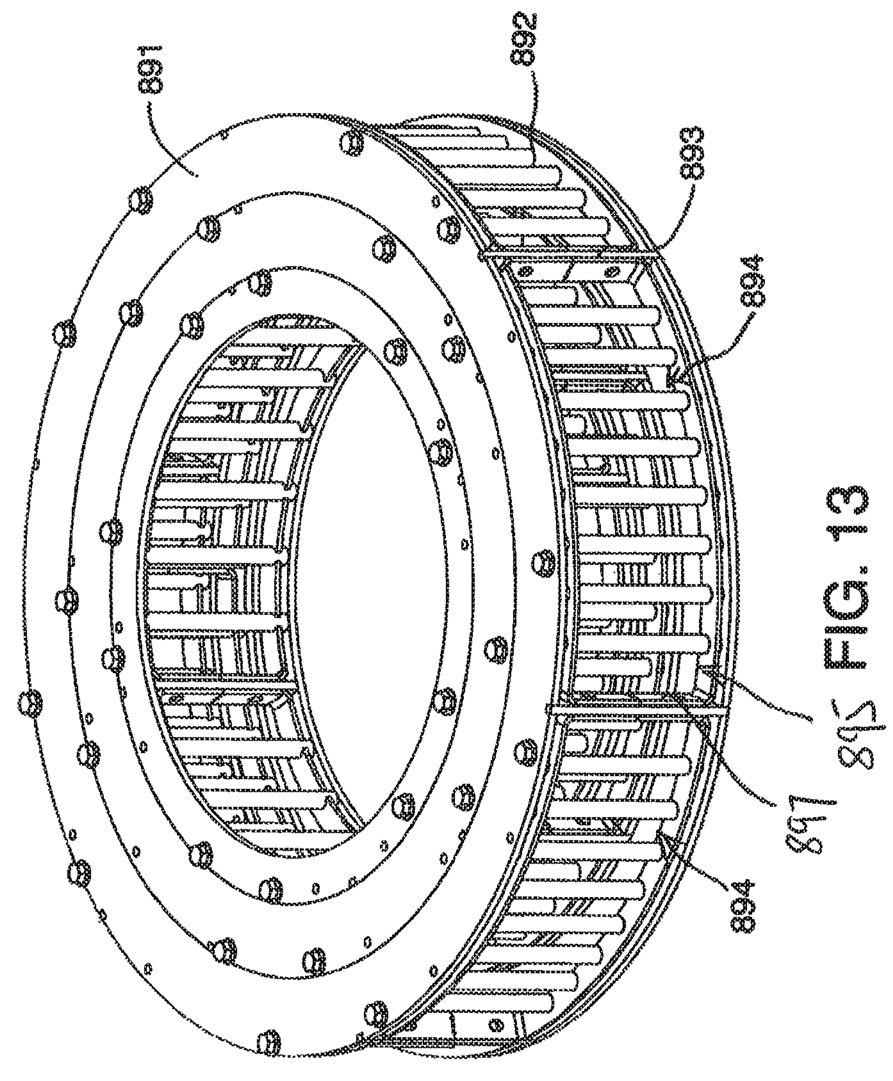
FIG. 13 is an isometric view of one stator frame of the embodiment of FIG. 10 including the replaceable stator components.
Figure 14:
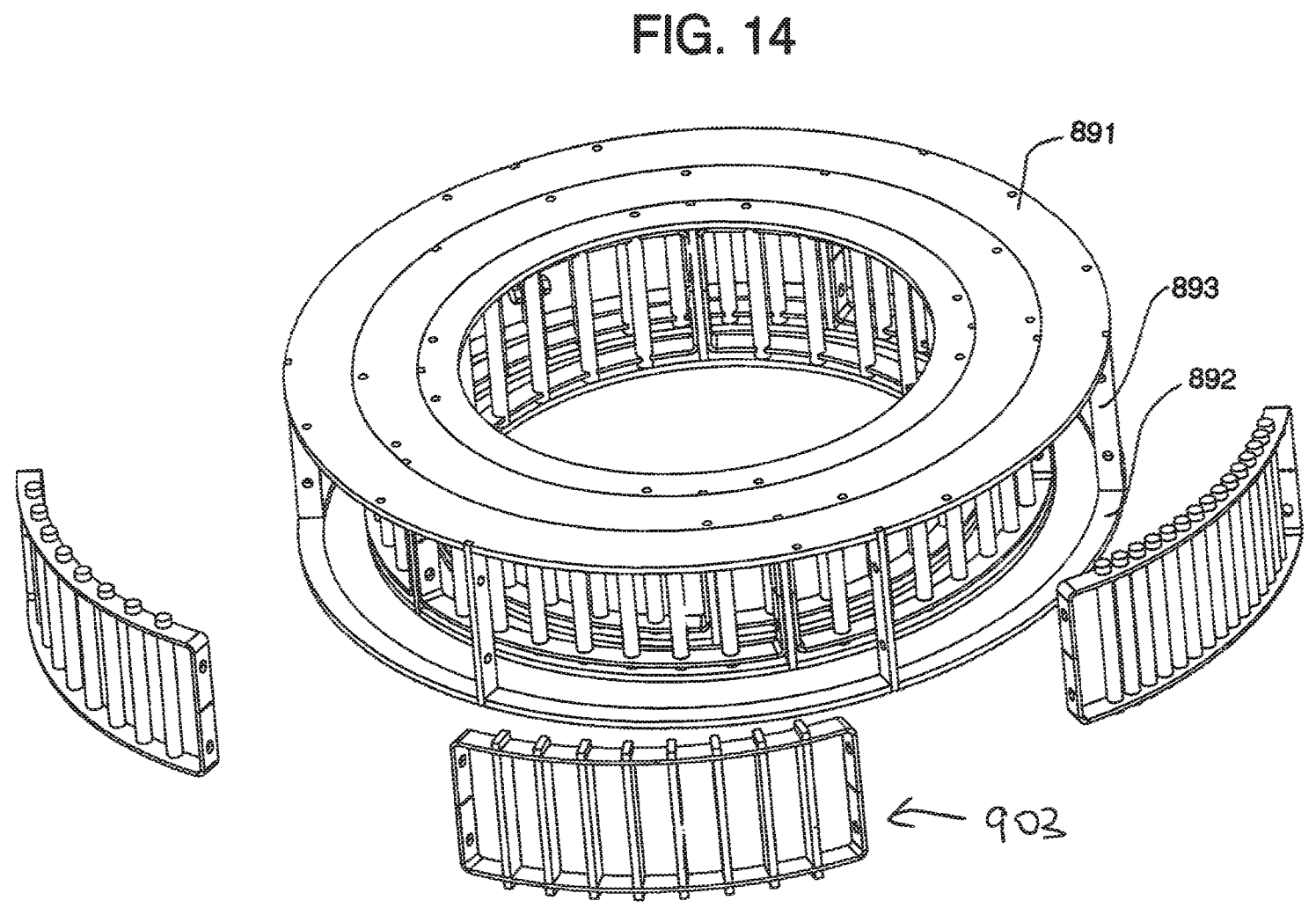
Figure 16:
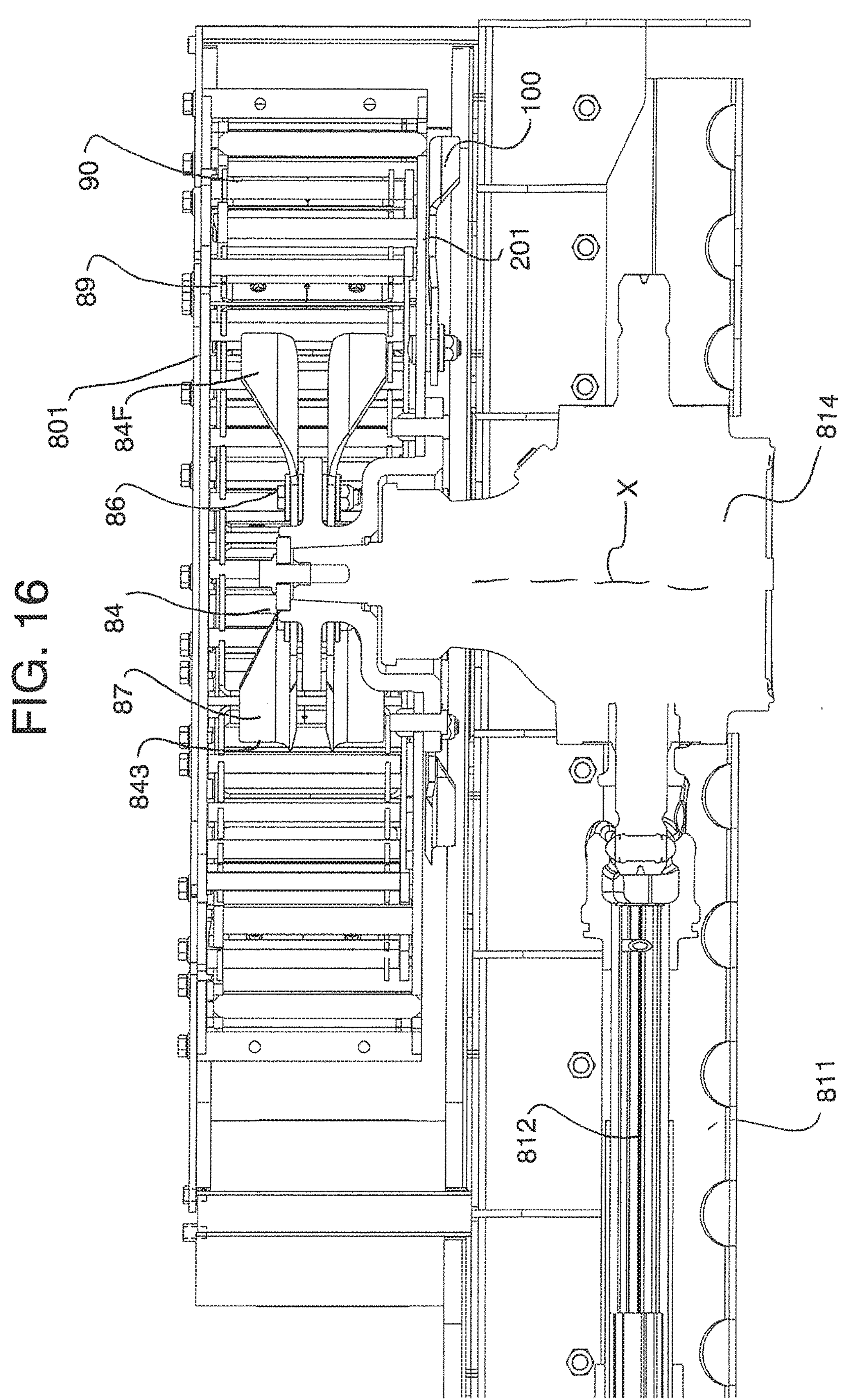
FIG. 16 is a cross sectional view on an enlarged scale of one part of the apparatus of FIG. 10.
Figure 18:
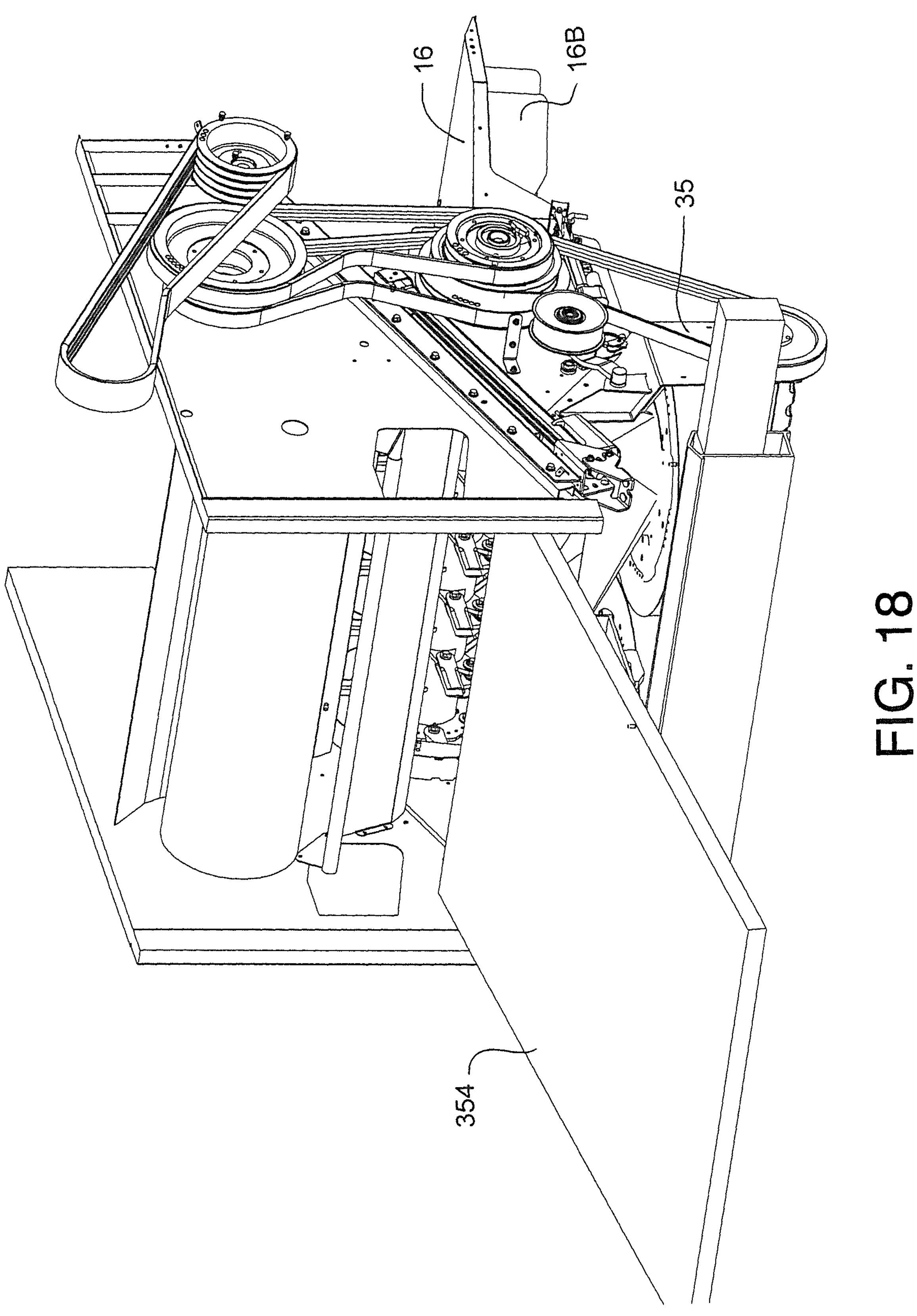
FIG. 18 is an isometric view from one side and the front of the combined apparatus including the straw chopper section and the weed seed destruction section of FIG. 17.

Each stator cylinder is of the construction shown in FIG. 14 and includes the top flange 891, a bottom ring 892 parallel to the flange and a plurality of upstanding connecting rails 893 to form a rigid structure as shown in FIG. 13.

The stator cylinder has a plurality of stator inserts 894 closing the space between the flange 891 and the bottom ring 892. Each insert forms a part cylindrical surface which extends around the axis by a limited angle. As shown in FIG. 13 there are six such inserts each covering an angle of the order of 60 degrees so that the plurality of inserts cooperate to surround the axis. The number of bars in the inserts can be selected to increase or decrease the number of openings and the angular extent of the plates can be selected to determine the angle over which the opening extends.

Each stator insert 894 is made up of a number of impact bars. Typically the insert is formed with two cylindrical flanges of a suitable metal which is then laser cut to form holes in an array to mount the impact bars. Different constructions of plate can be provided with different arrays and sizes of impact bars to provide a different grinding or impacting effect on the material in engagement with the plates. The inserts are shaped with an angled edge flange 897 which is shaped to engage against a side edge of a suitably shaped one of the rails 893. Thus as shown in FIG. 13, the ends 897 of the plates 894 engage against sides of the rails 898 and 899 with the opening 895 therebetween. Additional rails 901 between the end rails act as supports engaging the outer surface of the wall of the plate.

In FIG. 14, three types of stator inserts are shown, of which many more styles could be envisioned, which can be selected for use in the base frame of FIG. 13. In one insert the bars are round and shown extending in the vertical direction. In another insert the bars have a sharp square edge to quickly remove seed from the mill. In the third type of insert shown at 902, the insert is formed by a series of tightly spaced round bars 903 arranged with reduced openings between the bars to keep the seeds in the mill longer and thus create more damaging impacts. In practice the different inserts are used together at different locations in the mill to create the desired devitalization properties.

As shown in FIG. 14 therefore the mill includes at least one stator which includes an external frame with top and bottom rails containing replaceable inserts. This allows inserts of different geometry to be utilized in the assembly as selected depending on the type of seeds and conditions involved in the operation. Thus the different types of inserts using the different shape and spacing of the bars can be used to obtain the different effects. The system may use inserts only of one type or of different types as required. In order to provide the best wear characteristics, the inserts can be of a different hardness as compared with the frame allowing the frame to be constructed in a different manner than the inserts which require typically a greater hardness. The smaller components of the inserts allow a more effective hardening process to be used. In particular, the inserts can contain or comprise a different material than the stator frame.

In operation, the rotor flails 87 acts to accelerate, impact and direct the material across the inside surface of the inner stator insert 89 to impact, shear and force some of the material through the bars. The outer edge 843 of the flail blade thus acts to direct the material cross the inside surface of the selected stator insert with the edge 843 having a height substantially matching the height of the insert.

That material which does not escape through the bars 896 is carried around the inner surface of the insert 894 to the next one of a plurality of discharge slots or holes 895 around the plate 894. The material sliding on the inner surface thus can escape through the inner stator 89 to the next outer annular stator 90. Between the two stators 89, 90 is a ring of posts 92 which are attached to a base plate of the rotor so as to rotate with the center hub and flail blades. These posts act to impact, accelerate and shear the material round the inside surface of the outer stator 90.

The stator 90 has the same structure as the stator 89 but of increased diameter. Again there is a plurality of separate stator inserts 906 at angularly spaced positions. The outer stator therefore operates in the same manner under the rotation impetus on the material from the posts 92 to impact and shear the material and then to allow any remaining material remaining on the inner surface of the outer stator to escape outwardly through the openings 907 in the outer stator. The material escaping the slots is accelerated angularly by a final series of posts 94 attached to the rotating base of the rotor so that the material is flung outwardly and angularly against the outer stator surface 82.

Each stator which is in the form of a ring or cylinder supported from the top cover and located between the components of the rotor is thus formed from the fixed base frame shown in FIG. 13 with a plurality of locations each for mounting a respective one of the stator plate components with an outlet opening between each component and the next. As shown in FIG. 14, different forms of the stator inserts can then be selected for use with the frame of FIG. 13 and installed and replaced as required.

The use of separate stator inserts provides replaceable stator components which have a number of advantages which include:

a—simple service, it is possible to replace and discard small parts of the stator rather than the entire stator ring.

b—customer cost, the arrangement provides lower cost service parts, longer lasting parts with the possibility that the smaller parts of the components alone can be made harder.

c—manufacturing advantage, the components individually are lower cost, higher volume of a smaller part allowing economy of scale to provide cheaper manufacturing.

d—material, the manufacture of a smaller part allows the use of a higher value material for that part while the frame itself can be manufactured from other materials. This allows less material to be used, allows for harder or heat treatable material to be used for the wear surfaces of the replaceable stator components while softer, more ductile or weldable material can be used in the frame. In particular the stator components or plates form small parts which are suitable for hard surfacing or carbide coating processes to provide increased hardness and wear resistance.

e—Stator selection; this allows for different stator wear surface profiles, that is different shapes and arrangements of impact bars, to be selectable to best match to typical weed seed targets in each farming region. That is different regions in the world have different weed problems, so that the system of the present invention allows use of a common support frame and different wear inserts to best target the efficacy of the desired weed seed in that region.

f—Stator Style; the system can provide different styles of stator inserts to cover different manufacturers particular design of the stator. That is the stator component can carry a series of different impact elements 903 arranged on the component around the angular extent of the component with tighter impact elements separated by inserts designed to discharge seeds to the next stage.

The stator impact surfaces 903 can be movable in an adjustment movement about an axis parallel to the rotor axis so that the surface pivots relative to a tangent to the axis of the rotor so as to change the number of impacts caused to each weed seed. The replaceable stator surfaces may hard surface coated with a suitable material such as carbide which reduces impact damage. One or both stators 89 and 90 defined by the annular frame and the supported stator components can be adjusted by rotation around the axis of the rotor so as to move the position of the slots 895. This acts to change the distance that the material must traverse before it reaches a larger opening between impact bars.

Figure 11:
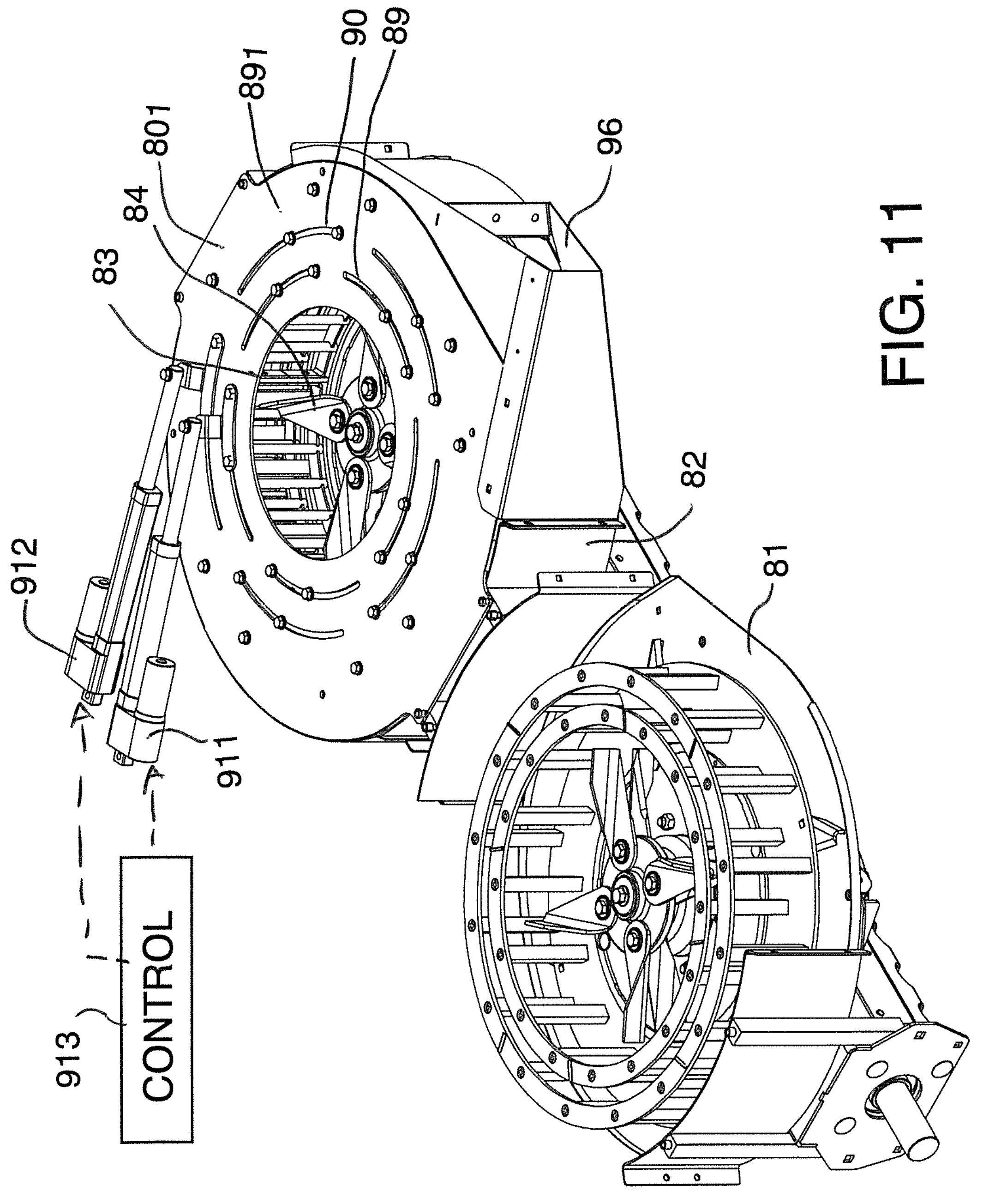
FIG. 11 is an isometric view the embodiment of FIG. 10 where
Figure 12:
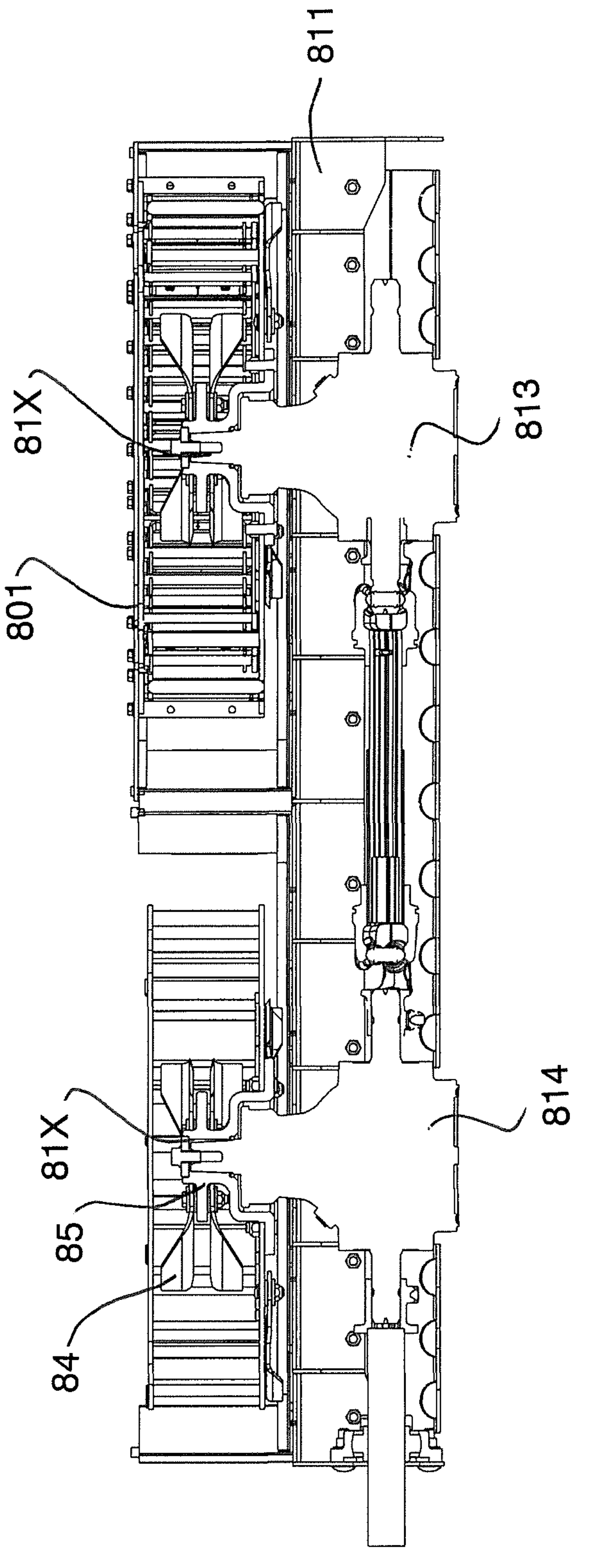
FIG. 12 is a cross-sectional view along the lines 12-12 of FIG. 10.

As shown in FIG. 12, the angular position of the stators 89 and 91 is adjustable around the axis X of the hub to move the openings 895 angularly. If the wider openings 895 of the inner stator 89 are located at an angular portions so that they are aligned with the widest openings 895 of the outer stator then any material exiting the openings of the inner stator will typically escape from the second stator by direct radial movement through both openings simultaneously thus minimizing any processing by the outer stator. Movement of one or both of the stators so that the inserts with the widest openings are not aligned will increase the effective processing by the second outer stator. It will be appreciated that this processing can be adjusted from a position of minimum processing where the widest opening are aligned to a position of maximum processing where each opening in the inner stator discharges onto the outer stator at a distance which is at the beginning of the adjacent stator component so that the material must traverse the whole surface of the narrowest opening insert before reaching an insert with a wide opening 895 in the outer stator. Also as shown in FIG. 11 are actuators 911 912 operated by a control 913 where the control is in the cab for on-the-go control of the position of the stators.

It will be appreciated that the weed destructor herein uses a significant amount of power to drive when empty and an increased amount when filled with the crop materials. This power can be minimized by bypassing the device as described herein and by disconnecting the drive thereto when no treatment of the crop materials is required. The power can be reduced as above by moving the stators to the most effective position with minimum crop treatment.

Thus the system herein provides adjustability of stator positions on the go, the advantages of which include:

a—Setting the stator contact surface to produce the best efficacy rate to match weed problems in field while reducing power requirements.

b—Reducing power by reducing stator contact time of the crop material. This is a significant advantage includes which allows increased combine harvest capacity as current destructor systems are reducing a farmer's threshing capacity by up to 30% as well as reduced fuel consumption.

c—Manual Adjustment on the go by In Cab control of an actuator allows the operator to change as they enter visible weed problem areas in the field. The actuator drives relative position of the stator rings to change the number of impact surfaces a seed encounters as it passes through the mill.

d—Automatic Adjustment on the go allows an operator to develop a GPS map of a weed problem by aerial surveillance or when mid-season spraying. This information can be used to adjust the stator positions for maximum seed efficacy using maximum power in that area and reduce contact surface after the combine passes through the weed area.

Figure 15:
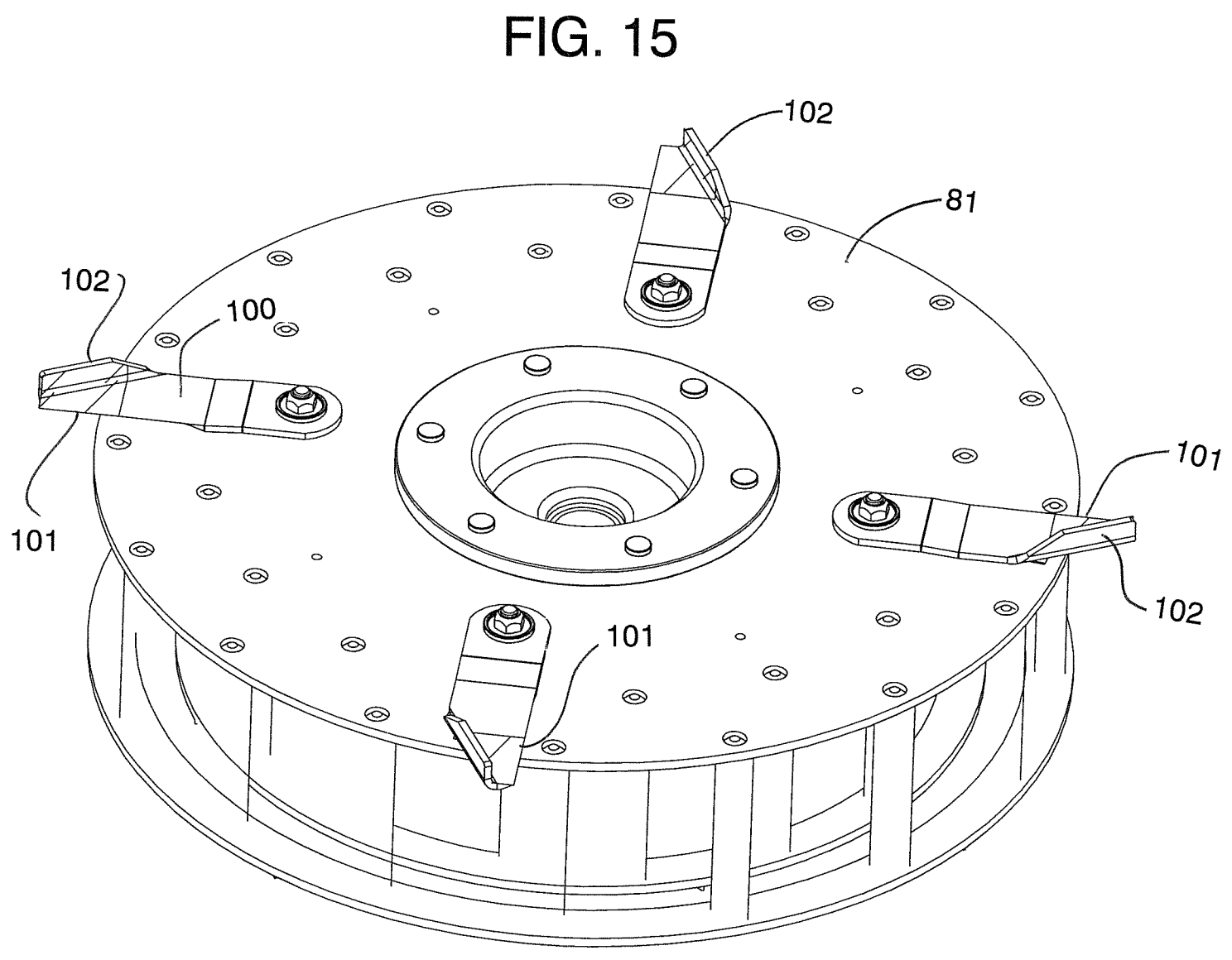

As shown in FIG. 15 the rotor also includes an additional swinging blade element outside of the outer stator element. This is used to overcome problems encountered in green re-growth areas of fields. It is typical for combine operators to desire to "mow down" green areas of the field as they often represent weed infested areas. This usually results in the heavy green material falling from the combine beater down onto the sieves, rather than being thrown to the chopper. Thus this green material is carried into the inlets 83 of the destructor units. In an arrangement where the stator surface acts as the last obstacle before the residue is ejected from the housing, this wet sticky material piles up and blocks the exit 96 of the housing. In this arrangement, mechanical ejection by a blade is provided to ensure the mill remains clear in conditions with heavy, wet or damp materials. As shown the blade 100 comprises a flat blade with a cutting edge 101 and an inclined downturned fan blade portion 102 to create more airflow thus discharging any buildup with contact and increased airflow.

As set forth above the rotor surfaces and optionally the stator surfaces are arranged to pivot to a position to increase a spacing between the stator and rotor surfaces to allow the passage of foreign objects between the rotor and stator surfaces.

The rotational speed of the rotor is adjustable to change the number of impacts a seed encounters during its passage.

In at least one stage, therefore, the weed seeds do not pass through the stator but are rebounded between the rotor and the stator. The rotor also propels the weed seed from the housing without needing to pass through an outside stator surface so that a higher exit velocity is obtained.

Turning now to FIGS. 17 to 21 there is shown a further embodiment of apparatus for destroying weed seeds which is similar to that shown in FIG. 8 in that it includes a straw chopper section 9 and a weed seed destructor section 35. The section 35 is of the construction shown in FIG. 10 so that it has an inlet 351 in the center of the housing 80 which is fed by a par of inlet chutes 352 taking the feed from across the sieve 354 which drops into a channel 353. Thus the intake of the destructor 35 is located in front (with respect to the direction of travel) of the chopper housing and with the rotor and stator underneath the chopper housing.

Figure 20:
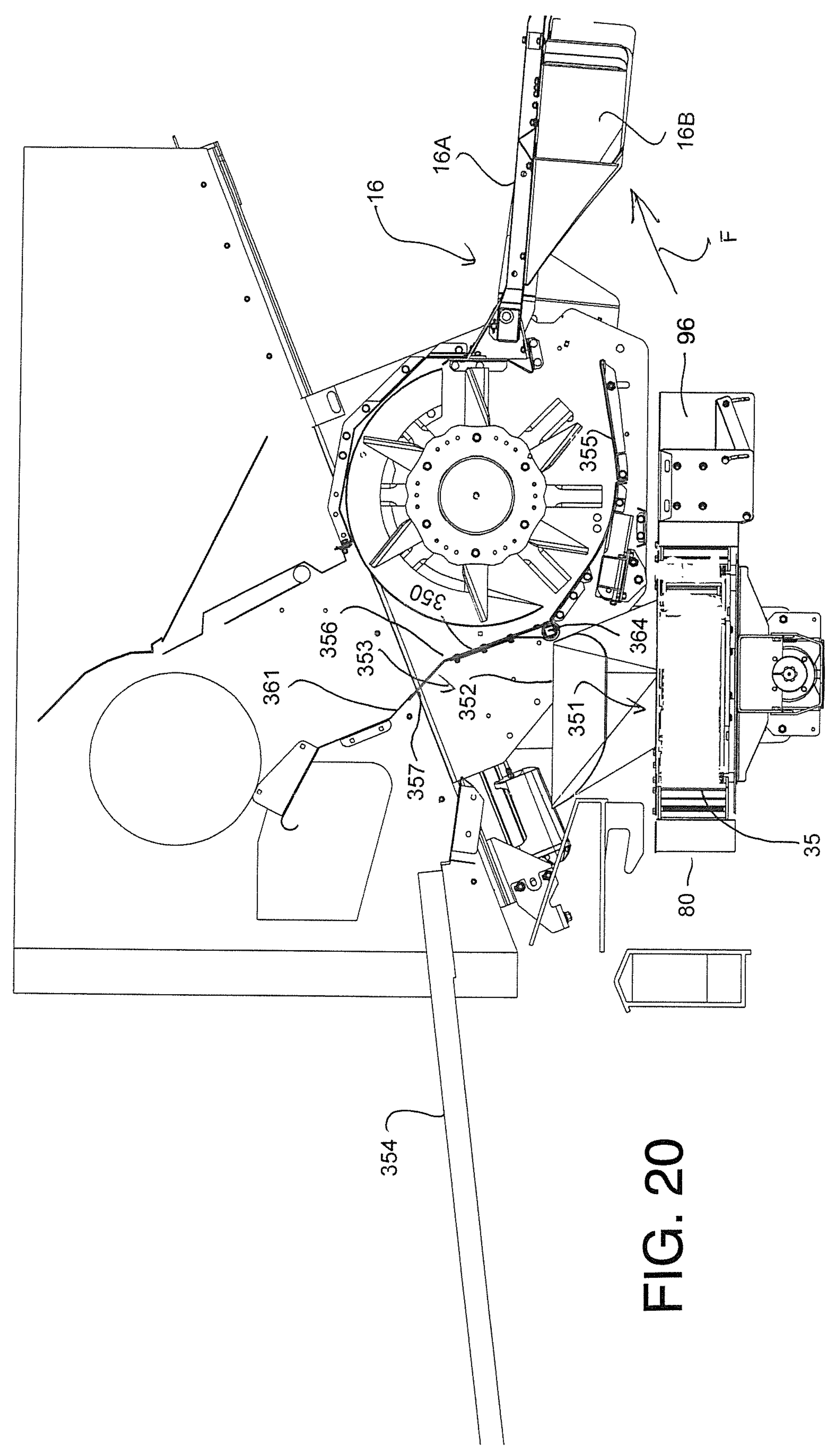
FIG. 20 is a cross-sectional view of the apparatus of FIGS. 17 and 18 mounted on a combine harvester and showing the apparatus in a first operating position in which the straw passes through the chopper housing and the chaff and weed seeds pass through the seed destructor section.

As best shown in FIG. 20, the destructor 35 is mounted on the housing of the chopper at a position lower than in FIG. 8 so that the top wall of the destructor 35 is underneath the bottom wall 355 of the chopper housing. Thus the discharge mouths 96 release the chaff and weed seeds from a position below the chopper that is underneath the bottom wall of the chopper housing so as to direct the second material along the direction F underneath the bottom wall 355 directly onto the tailboard 16A forming the spreading device. Thus the tailboard 16A is inclined downwardly and the chaff is fed onto the tailboard to join with the straw and airflow from the chopper so that both materials are spread in a common action by the fins 16B. This acts to provide an improved spreading action on the chaff which tends to be very light and fluffy due to its passage through the destructor. Thus the added momentum from the heavier and more dense straw is communicated to the fluffier chaff to provide a full spreading action which can match the cutting width of the header.

Figure 21:
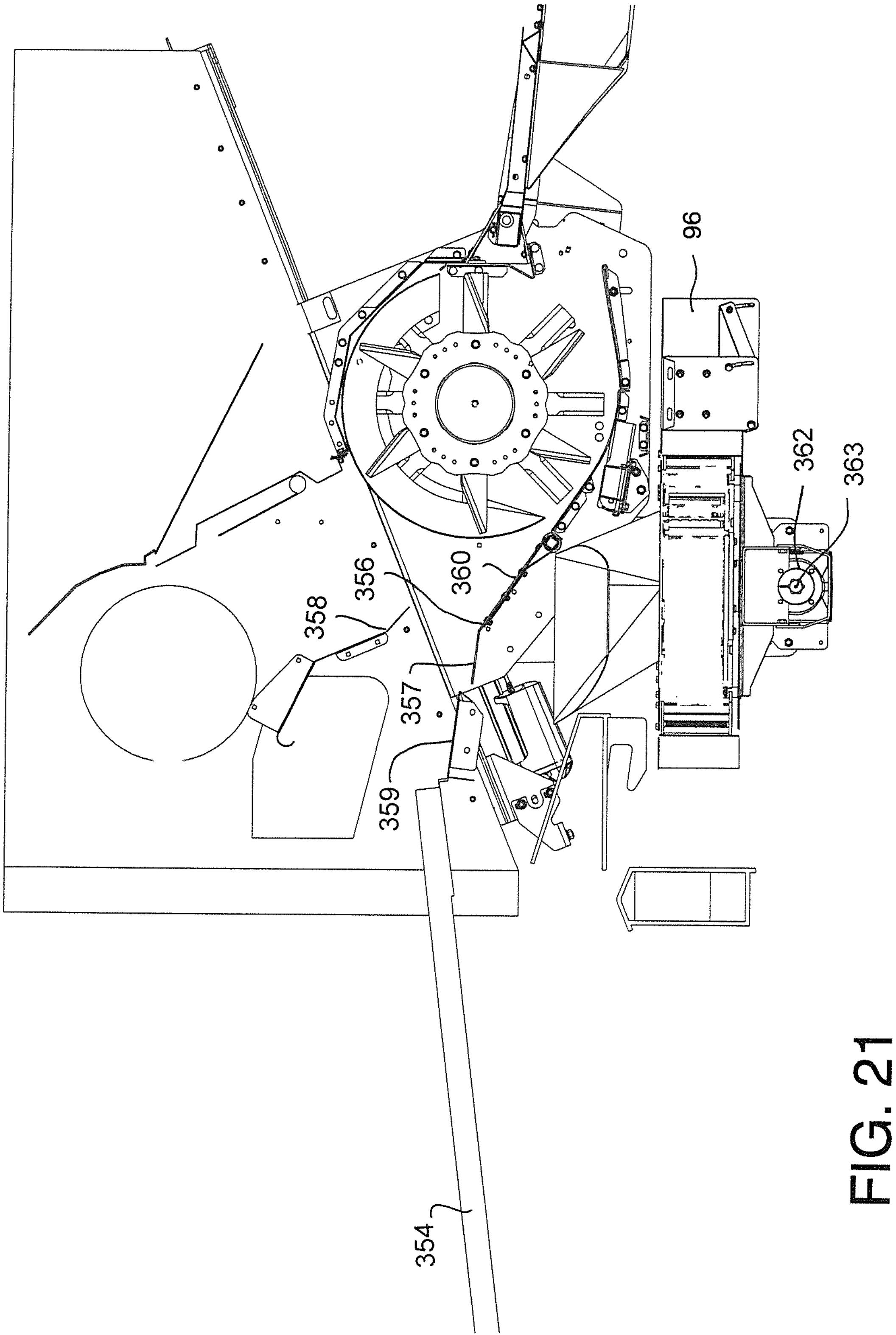
FIG. 21 is a cross-sectional view of the apparatus of FIGS. 17 and 18 mounted on a combine harvester and showing the apparatus in a second operating position in which both the chaff and weed seeds and the straw pass through the chopper housing.

As shown by comparing FIGS. 20 and 21 the guide channel 353 includes a guide wall component 356 movable between a first position shown in FIG. 14 and a second position shown in FIG. 21.

In FIG. 20 the chaff and weed seeds from the sieve are directed into the weed seed destructor, while the straw from the first discharge location enters the chopper housing. This is achieved by moving the component 356 from a position in FIG. 20 which is raised so that the chaff passes underneath the component. Thus the component includes a portion 360 defining a front wall of the chopper and an upper tip portion 357 which contacts a guide surface 361 of the straw channel from the combine. In FIG. 21 the component 356 Is moved so that the tip portion 357 engages a guide surface 359 of the chaff transfer channel from the sieve 354. Thus in the second position shown in FIG. 21 the component 356 shuts off the flow to the destructor 35 and instead directs the chaff and weed seeds from the second discharge location into the chopper housing with the straw.

The guide wall component 356 comprises the front wall portion 360 of the chopper housing which is pivotal about an axis 364 across a front of the chopper housing and parallel to the axis of the chopper rotor.

When the system is arranged to bypass the destructor as shown in FIG. 21, a clutch 362 is operated to halt drive to the rotors of the weed seed destructor 35 from the input drive shaft 363.

Adjustment of the passage of chaff into the mill and powering of the mill on the go provides advantages:

- a—Based on either IN CAB operator control or GPS control, an actuator drives the door 356 at the front of the chopper to bypass the mill and flow all residue into the chopper or alternately direct chaff into the mill and only straw into the chopper, thus saving power, time, combine capacity when not needed.
- b—At the same time the actuator operates the clutch 362 to stop the mill from turning when not needed, thus eliminating the empty mill power requirement, which is typically about 30 HP.

Figure 19:
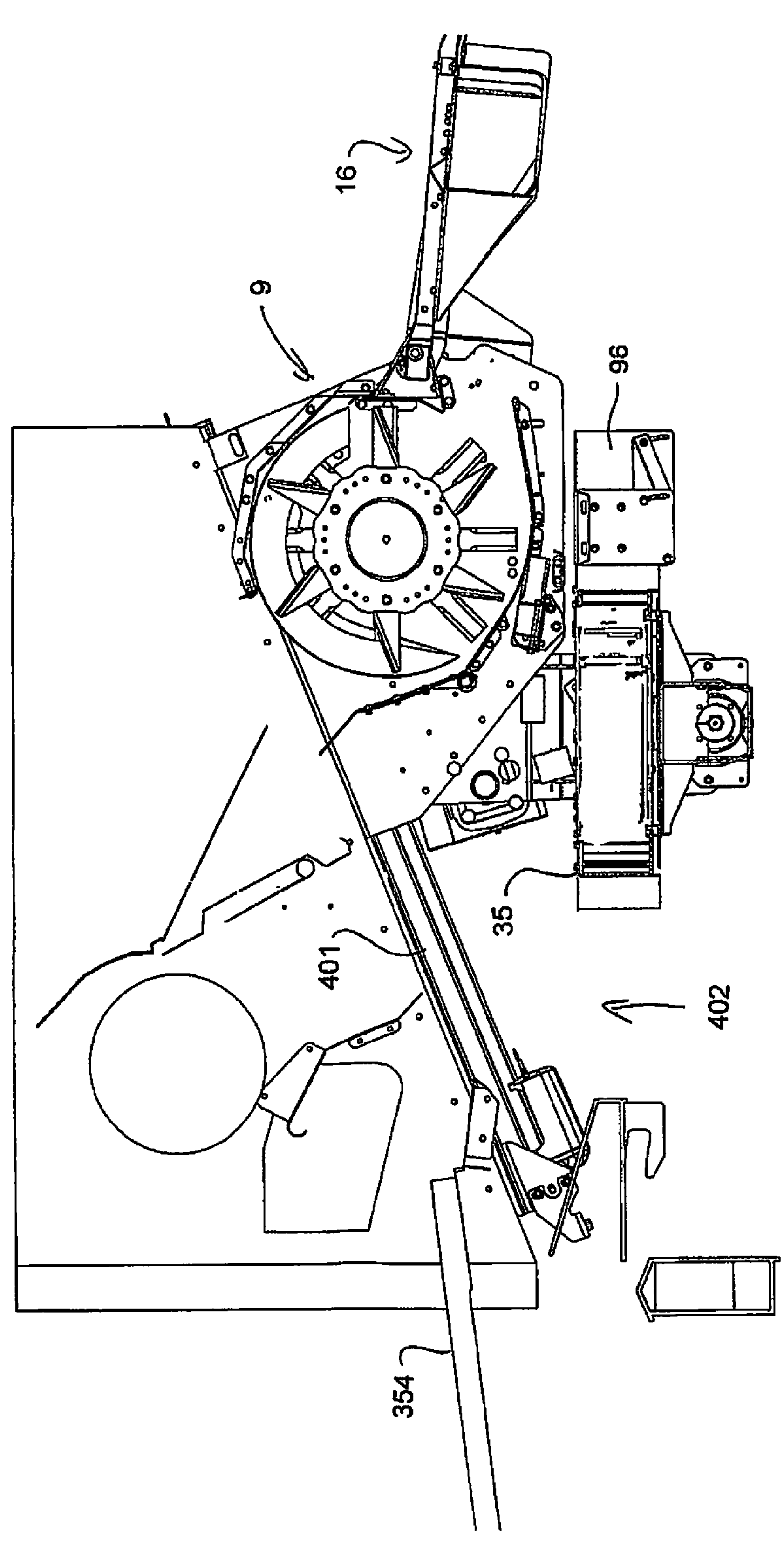
FIG. 19 is a cross-sectional view of the apparatus of FIGS. 17 and 18 mounted on a combine harvester and showing the apparatus in a rearwardly displaced position providing access to the sieve of the combine harvester

As best shown by comparing FIGS. 19 and 20, the destructor 35 and the chopper 9 are formed as a common unit which is movable rearwardly of the combine harvester along a track 401. The common unit can thus take up the operating position shown in FIG. 20 where the chopper inlet is aligned with the straw supply duct and the destructor inlet 351 is aligned with the chaff inlet from the sieve 354. Also the combined unit can move to the rearward position shown in FIG. 19 where the destructor is moved rearwardly of the combine harvester away from the sieve 354 to allow access to a position between the destructor 35 and the sieve of the combine harvester. This allows the operator to access the sieve by entering an opening 402 in front of the destructor 35 and behind the axle of the combine to visibly inspect the sieve.

Thus at least the weed seed destructor section 35 and optionally also the chopper section is slidable on the guide 401 in a rearward direction. The guide 401 includes a pair of tracks each on a respective side wall of the combine harvester and a suitable slide component on the common unit.

The drive for the weed seed destruction section is driven from the slow-speed drive of the chopper. A selector on the chopper allows the chopper to operate in either high speed or low speed. Therefore the chopper can be selected to operate in low speed with the weed seed destruction section still operating. Therefore either chopper speed can be selected without effecting the operation of the weed seed destruction section.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A combine harvester comprising:

a separation system for separating from harvested crop a first material comprising straw and a second material comprising chaff and weed seeds;

a weed seed devitalizer comprising:

a housing mounted at a location on the combine harvester for receiving the second material containing separated chaff and weed seeds;

at least one rotor mounted in the housing for rotation about a rotor axis and including rotor surfaces thereon for engaging the second material;

at least one stator including a plurality of stator surfaces for engaging the weed seeds in the second material;

and a controller configured during harvesting to:

receive data relating to a weed problem defined by a prevalence of weeds in an area to be harvested; and output control signals controlling operation of the weed seed devitalizer based on the data.

2. The combine harvester according to claim 1, wherein the data includes a GPS map of the weed problem defined by a prevalence of weeds previously created.

3. The combine harvester according to claim 1, wherein the data is previously created by aerial surveillance or during mid-season spraying.

4. The combine harvester according to claim 1, wherein the control signals actuate the weed seed devitalizer between an off state and an on-state and from a first on-state to a second on-state different than the first on-state.

5. The combine harvester according to claim 4, wherein the rotor is controlled by said controller to rotate at a first non-zero speed in the first on-state and a second non-zero speed in the second on-state.

6. The combine harvester according to claim 1, wherein the controller is arranged to control the operation of the devitalizer by adjusting an angular position of at least some of the stator surfaces around the rotor axis.

7. The combine harvester according to claim 6, wherein said at least one stator is annular and said adjusting of said at least some of the stator surfaces around the rotor axis is caused by rotation of the annular stator around the rotor axis.

8. The combine harvester according to claim 6, wherein said at least one stator includes an opening therein at an angular location thereon for passage therethrough of the weed seeds.

9. The combine harvester according to claim 6, wherein said at least one stator includes an opening therein at an angular location thereon for passage therethrough of the weed seeds and wherein said rotation causes a change in the angular location of the opening around the rotor axis.

10. The combine harvester according to claim 6, wherein said at least one stators comprises inner and outer coaxial cylindrical stators with an annular rotor component between the inner and outer stators.

11. The combine harvester according to claim 6, wherein said at least one stator comprises a plurality of upstanding impact bars at angularly spaced positions around the rotor axis.

12. A combine harvester comprising:

a separation system for separating from harvested crop a first material comprising straw and a second material comprising chaff and weed seeds;

a weed seed devitalizer comprising:

a housing mounted at a location on the combine harvester for receiving the second material containing separated chaff and weed seeds;

at least one rotor mounted in the housing for rotation about a rotor axis and including rotor surfaces thereon for engaging the second material;

at least one stator including a plurality of stator surfaces for engaging the weed seeds in the second material;

and a controller configured to output control signals controlling operation of the weed seed devitalizer;

wherein the controller is arranged to control the operation of the devitalizer by adjusting an angular position of at least some of the stator surfaces around the rotor axis.

13. The combine harvester according to claim 12, wherein the rotor is controlled by said controller to rotate at a first non-zero speed in a first on-state and a second non-zero speed in a second on-state.

14. The combine harvester according to claim 12, wherein said at least one stator is annular and said adjusting of said at least some of the stator surfaces around the rotor axis is caused by rotation of the annular stator around the rotor axis.

15. The combine harvester according to claim 14, wherein said at least one stator includes an opening therein at an angular location thereon for passage therethrough of the weed seeds.

16. The combine harvester according to claim 14, wherein said at least one stator includes an opening therein at an angular location thereon for passage therethrough of the weed seeds and wherein said rotation causes a change in the angular location of the opening around the rotor axis.

17. The combine harvester according to claim 14, wherein said at least one stator comprises inner and outer coaxial cylindrical stators with an annular rotor component between the inner and outer stators.

18. The combine harvester according to claim 14, wherein said at least one stator comprises a plurality of upstanding impact bars at angularly spaced positions around the axis.

19. A combine harvester comprising:

a separation system for separating from harvested crop a first material comprising straw and a second material comprising chaff and weed seeds;

a weed seed devitalizer comprising:

a housing mounted at a location on the combine harvester for receiving the second material containing separated chaff and weed seeds;

and at least one weed seed destructor for receiving both the chaff and weed seeds comprising destructor components in said housing for causing devitalization of the weed seeds so as to reduce a number of the weed seeds that can germinate;

receive data relating to a weed problem defined by a prevalence of weeds in an area to be harvested; and output control signals controlling operation of the weed seed devitalizer based on the data.

20. The combine harvester according to claim 19, wherein the data includes a GPS map of the weed problem defined by a prevalence of weeds previously created.

21. The combine harvester according to claim 19, wherein the data is previously created by aerial surveillance or during mid-season spraying.

22. The combine harvester according to claim 19, wherein the control signals actuate the weed seed devitalizer between an off state and an on-state and from a first on-state to a second on-state different than the first on-state.

* * * * *